(12) United States Patent
Huang et al.

(10) Patent No.: US 11,943,018 B2
(45) Date of Patent: *Mar. 26, 2024

(54) HYBRID CLOSED-LOOP MULTIPLE-INPUT MULTIPLE-OUTPUT AND TRANSPARENT DIVERSITY SCHEMES

(71) Applicant: QUALCOMM Incorporated, San Diego, CA (US)

(72) Inventors: Yi Huang, San Diego, CA (US); Gokul Sridharan, Sunnyvale, CA (US); Wei Yang, San Diego, CA (US); Taesang Yoo, San Diego, CA (US); Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/160,875

(22) Filed: Jan. 27, 2023

(65) Prior Publication Data

US 2023/0283331 A1 Sep. 7, 2023

Related U.S. Application Data

(63) Continuation of application No. 17/255,134, filed as application No. PCT/US2019/038741 on Jun. 24, (Continued)

(51) Int. Cl.
*H04B 7/0456* (2017.01)
*H04B 7/0491* (2017.01)
(Continued)

(52) U.S. Cl.
CPC ........... *H04B 7/046* (2013.01); *H04B 7/0456* (2013.01); *H04B 7/0486* (2013.01);
(Continued)

(58) Field of Classification Search
CPC .... H04B 7/046; H04B 7/0456; H04B 7/0486; H04B 7/0491; H04B 7/063; H04B 7/0404;
(Continued)

(56) References Cited

U.S. PATENT DOCUMENTS 6,594,473 B1 7/2003 Dabak et al.
6,731,619 B1 5/2004 Ramesh et al.
(Continued)

FOREIGN PATENT DOCUMENTS

EP 3579449 A1 12/2019
EP 3672097 A1 6/2020
WO WO2008098092 8/2008

OTHER PUBLICATIONS

US 11,569,877 B2, 01/2023, Huang et al. (withdrawn)
(Continued)

*Primary Examiner* — Vineeta S Panwalkar
(74) *Attorney, Agent, or Firm* — Holland & Hart LLP

(57) ABSTRACT

Methods, systems, and devices for wireless communications are described. A user equipment (UE) having partially coherent antennas may be configured for simultaneous transmissions on groups of antennas. To achieve the benefits of simultaneous transmissions using groups of antenna that are partially coherent, without having the transmissions affect each other, the UE may apply a hybrid closed-loop multiple-input multiple-output (MIMO) scheme among each antenna in the antenna groups where phase coherence can be maintained. Following the hybrid closed-loop MIMO scheme, the UE may apply a transparent diversity scheme across each antenna of the groups. Alternatively, the UE may first apply the transparent diversity scheme and next apply the hybrid closed-loop MIMO scheme. By applying a hybrid closed-loop MIMO scheme, and a transparent diversity scheme, the
(Continued)

UE may fully realize its resources and contribute to an improved spatial diversity for a MIMO system.

30 Claims, 17 Drawing Sheets

Related U.S. Application Data 2019, now Pat. No. 11,641,225, which is a continuation of application No. 16/449,246, filed on Jun. 21, 2019, now Pat. No. 10,673,500.

(60) Provisional application No. 62/689,801, filed on Jun. 25, 2018.

(51) Int. Cl.
  *H04B 7/06* (2006.01)
  *H04W 52/08* (2009.01)

(52) U.S. Cl.
  CPC ........... *H04B 7/0491* (2013.01); *H04B 7/063* (2013.01); *H04W 52/08* (2013.01)

(58) Field of Classification Search
  CPC .. H04B 17/309; H04B 7/0473; H04B 7/0691; H04B 7/0469; H04B 7/0689; H04W 52/08
  See application file for complete search history.

(56) References Cited

U.S. PATENT DOCUMENTS

| | | |
|---|---|---|
| 6,865,377 B1 | 3/2005 | Lindskog et al. |
| 8,149,942 B1 | 4/2012 | Wang et al. |
| 8,780,771 B2 | 7/2014 | Kim et al. |
| 8,953,478 B2 | 2/2015 | Davydov et al. |
| 9,831,932 B2 | 11/2017 | Kang et al. |
| 10,673,500 B2 | 6/2020 | Huang et al. |
| 2004/0067738 A1 | 4/2004 | Raghothaman |
| 2005/0042988 A1 | 2/2005 | Hoek et al. |
| 2006/0067421 A1 | 3/2006 | Walton et al. |
| 2008/0192856 A1 | 8/2008 | Jongren et al. |
| 2011/0150052 A1 | 6/2011 | Erell et al. |
| 2013/0022142 A1 | 1/2013 | Nammi |
| 2013/0272147 A1 | 10/2013 | Vermani et al. |
| 2018/0048365 A1 | 2/2018 | Yoo et al. |
| 2019/0089429 A1 | 3/2019 | Wei et al. |

OTHER PUBLICATIONS

International Preliminary Report on Patentability—PCT/US2019/038741, The International Bureau of WIPO—Geneva, Switzerland, dated Jan. 7, 2021.
International Search Report and Written Opinion—PCT/US2019/038741—ISA/EPO—dated Aug. 16, 2019.
Taiwan Search Report—TW108121956—TIPO—dated Jul. 6, 2022.
Taiwan Search Report—TW108121956—TIPO—dated Feb. 15, 2023 (183856TW).

HYBRID CLOSED-LOOP MULTIPLE-INPUT MULTIPLE-OUTPUT AND TRANSPARENT DIVERSITY SCHEMES

CROSS REFERENCES TO RELATED APPLICATIONS

The present application for patent is a Continuation of U.S. patent application Ser. No. 17/255,134 by Huang et al., entitled "HYBRID CLOSED-LOOP MULTIPLE-INPUT MULTIPLE-OUTPUT AND TRANSPARENT DIVERSITY SCHEMES" filed Dec. 22, 2020, which is a 371 national phase filing of International Patent Application No. PCT/US2019/038741 by Huang et al., entitled "HYBRID CLOSED-LOOP MULTIPLE-INPUT MULTIPLE-OUTPUT AND TRANSPARENT DIVERSITY SCHEMES", filed Jun. 24, 2019; and to U.S. patent application Ser. No. 16/449,246 by Huang et al., entitled "HYBRID CLOSED-LOOP MULTIPLE-INPUT MULTIPLE-OUTPUT AND TRANSPARENT DIVERSITY SCHEMES", filed Jun. 21, 2019, and to U.S. Provisional Patent Application No. 62/689,801 by Huang et al., entitled "HYBRID CLOSED-LOOP MULTIPLE-INPUT MULTIPLE-OUTPUT AND TRANSPARENT DIVERSITY SCHEMES," filed Jun. 25, 2018, each of which is assigned to the assignee hereof, and each of which is hereby incorporated by reference herein in its entirety.

BACKGROUND

The present disclosure relates to wireless communications systems, and more specifically to hybrid closed-loop multiple-input multiple-output (MIMO) and transparent diversity scheme in new radio (NR).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems such as MIMO systems, a base station and UE may use multiple antennas to communicate with each other. The multiple antennas of a base station or UE may, in some cases, be partially coherent. As such, some pairs of antennas (or antenna ports) may be coherent, whereas other pairs of antennas (or antenna ports) may be incoherent. A pair of antennas can be coherent for uplink transmissions if the UE is capable of preserving a phase coherence between the pair. That is, the phases between the pair of antennas are fixed between sounding reference signal (SRS) and physical uplink shared channel (PUSCH). If the base station or the UE is unable to maintain the phase coherence, the pair of antennas can be considered noncoherent (incoherent or not coherent). Such partially coherent condition may be due, for example, to hardware issues of the base station or UE.

In some cases, a pair of antennas that are noncoherent may be restricted from simultaneous transmission with another pair of antennas that are coherent. That is, the base station or UE may be incapable of transmitting on two beams simultaneously—one beam may correspond to a pair of antennas that are coherent and the other beam may correspond to a pair of antennas that are noncoherent—because the transmission from the noncoherent pair of antennas may affect the transmission from the coherent pair of antennas. Limiting transmission for a base station or UE having partially coherent antennas may affect their performance (e.g., time and frequency resources, inefficient power utilization, etc.).

SUMMARY

The described techniques relate to improved methods, systems, devices, and apparatuses that support hybrid closed-loop multiple-input multiple-output (MIMO) and transparent diversity schemes in new radio (NR). A user equipment (UE) in a wireless communications system having partially coherent antennas may be configured for simultaneous transmissions on groups of antennas that may be partially coherent. A first group of antennas may include antennas that are coherent and another group of antenna may include antennas that are noncoherent. In an example, a UE may have four antennas, which may be partitioned into two antenna groups (AGs) (e.g., $AG_0$ and $AG_1$). The first group, $AG_0$, may have $antenna_0$ and $antenna_1$, while the second group, $AG_1$, may include $antenna_2$ and $antenna_3$. To achieve the benefits of simultaneous transmissions using both antenna groups $AG_0$ and $AG_1$, without having the transmissions affect each other (e.g., interference), the UE may apply a hybrid scheme including both a closed-loop MIMO scheme and a transparent diversity scheme. The closed-loop MIMO scheme may be applied among each antenna in the antenna groups $AG_0$ and $AG_1$ where phase coherence can be maintained. The hybrid closed-loop MIMO scheme may be a multiplexing scheme or a beamforming scheme, among others.

Following the hybrid closed-loop MIMO scheme, the UE may apply a transparent diversity scheme (e.g., cyclic delay diversity (CDD), such as small delay CDD (SCDD)) among the antenna groups $AG_0$ and $AG_1$ to achieve spatial diversity between the two antenna groups. Alternatively, the UE may first apply the transparent diversity scheme and next apply the closed-loop MIMO scheme. By applying both a closed-loop MIMO scheme and a transparent diversity scheme, the UE may fully utilize its resources and decrease instances of wasted (e.g., unused) resources. For example, the UE may be allocated a transmit power of 40 dBm. If the UE has two groups of antennas—one pair that is coherent and another pair that is noncoherent—some conventional techniques may restrict the UE from using both groups (e.g., the noncoherent pairs of antennas) for simultaneous transmission. According to the described techniques herein, however, the UE may be capable of using more or all of the allocated transmit power by using both antenna groups. In addition, by configuring and enabling the UE with this ability (e.g., hybrid closed-loop MIMO plus transparent diversity scheme) may result in improved spatial diversity for the wireless communications system. Though, the described techniques herein relate to partially coherent antennas, these techniques may additionally, or alternatively, apply to fully coherent sets of antennas.

A method for wireless communication at a UE is described. The method may include receiving, from a base station, an indication that the UE is to use both a closed-loop MIMO scheme and a transparent diversity scheme for transmissions of uplink data using a set of antenna ports that include a set of groups of antenna ports, antenna ports within each group of antenna ports being phase coherent with each other antenna port belonging to the group of antenna ports and being phase incoherent with the antenna ports belonging to at least one other group of antenna ports; generating, from the uplink data, a set of output signals corresponding to the set of antenna ports based on applying the closed-loop MIMO scheme for the set of groups of antenna ports and the transparent diversity scheme among antenna ports belonging to different groups of antenna ports; and transmitting the set of output signals using the set of antenna ports.

An apparatus for wireless communications is described. The apparatus may include a processor, memory in electronic communication with the processor, and instructions stored in the memory. The instructions may be executable by the processor to cause the apparatus to receive, from a base station, an indication that the UE is to use both a closed-loop MIMO scheme and a transparent diversity scheme for transmissions of uplink data using a set of antenna ports that include a set of groups of antenna ports, antenna ports within each group of antenna ports being phase coherent with each other antenna port belonging to the group of antenna ports and being phase incoherent with the antenna ports belonging to at least one other group of antenna ports; generate, from the uplink data, a set of output signals corresponding to the set of antenna ports based part on applying the closed-loop MIMO scheme for the set of groups of antenna ports and the transparent diversity scheme among antenna ports belonging to different groups of antenna ports; and transmit the set of output signals using the set of antenna ports.

Another apparatus for wireless communications is described. The apparatus may include means for receiving, from a base station, an indication that the UE is to use both a closed-loop MIMO scheme and a transparent diversity scheme for transmissions of uplink data using a set of antenna ports that include a set of groups of antenna ports, antenna ports within each group of antenna ports being phase coherent with each other antenna port belonging to the group of antenna ports and being phase incoherent with the antenna ports belonging to at least one other group of antenna ports; means for generating, from the uplink data, a set of output signals corresponding to the set of antenna ports based on applying the closed-loop MIMO scheme for the set of groups of antenna ports and the transparent diversity scheme among antenna ports belonging to different groups of antenna ports; and means for transmitting the set of output signals using the set of antenna ports.

A non-transitory computer-readable medium storing code for wireless communications is described. The code may include instructions executable by a processor to receive, from a base station, an indication that the UE is to use both a closed-loop MIMO scheme and a transparent diversity scheme for transmissions of uplink data using a set of antenna ports that include a set of groups of antenna ports, antenna ports within each group of antenna ports being phase coherent with each other antenna port belonging to the group of antenna ports and being phase incoherent with the antenna ports belonging to at least one other group of antenna ports; generate, from the uplink data, a set of output signals corresponding to the set of antenna ports based on applying the closed-loop MIMO scheme for the set of groups of antenna ports and the transparent diversity scheme among antenna ports belonging to different groups of antenna ports; and transmit the set of output signals using the set of antenna ports.

Some examples of the method, apparatuses, and non-transitory computer-readable medium described herein for applying the closed-loop MIMO scheme and the transparent diversity scheme may further include operations, features, means, or instructions for applying the closed-loop MIMO scheme to the uplink data among the antenna ports within each group of the set of groups of antenna ports; and applying, to an output of the applied closed-loop MIMO scheme, the transparent diversity scheme among the groups of antenna ports.

Some examples of the method, apparatuses, and non-transitory computer-readable medium described herein for applying the closed-loop MIMO scheme may further include operations, features, means, or instructions for precoding, for a first group of the set of groups of antenna ports, the uplink data according to a first precoder; and precoding, for a second group of the set of groups of antenna ports, the uplink data according to a second precoder different from the first precoder.

In some examples of the method, apparatuses, and non-transitory computer-readable medium described herein, the first precoder and the second precoder have a same rank.

Some examples of the method, apparatuses, and non-transitory computer-readable medium described herein for applying the closed-loop MIMO scheme and the transparent diversity scheme to the uplink data may further include operations, features, means, or instructions for applying, to the uplink data, the transparent diversity scheme among the antenna ports of the set of groups of antenna ports; and applying the closed-loop MIMO scheme to an output of the applied transparent diversity scheme.

Some examples of the method, apparatuses, and non-transitory computer-readable medium described herein for applying the closed-loop MIMO scheme and the transparent diversity scheme to uplink data may further include operations, features, means, or instructions for applying the transparent diversity scheme among each antenna port of a first group of antenna ports and a corresponding antenna port of a second group of antenna ports to generate a set of virtual antenna ports; and applying the closed-loop MIMO scheme to the set of virtual antenna port.

Some examples of the method, apparatuses, and non-transitory computer-readable medium described herein may further include operations, features, means, or instructions for virtually combining (e.g., applying the transparent diversity scheme among) each antenna port of a first group of antenna ports and a corresponding antenna port of a second group of antenna ports to generate a set of virtual sounding reference signal (SRS) ports; and transmitting a SRS separately for each of the set of virtual antenna ports.

In some examples of the method, apparatuses, and non-transitory computer-readable medium described herein, the uplink data includes a set of data streams corresponding to a set of layers.

In some examples of the method, apparatuses, and non-transitory computer-readable medium described herein, the transparent diversity scheme includes small delay cyclic delay diversity.

In some examples of the method, apparatuses, and non-transitory computer-readable medium described herein, the closed-loop MIMO scheme uses rank one precoding.

In some examples of the method, apparatuses, and non-transitory computer-readable medium described herein, the closed-loop MIMO scheme uses at least rank two precoding.

Some examples of the method, apparatuses, and non-transitory computer-readable medium described herein for receiving the indication may further include operations, features, means, or instructions for receiving downlink control information (DCI) indicating a rank associated with the uplink data to which the closed-loop MIMO scheme is to be applied.

Some examples of the method, apparatuses, and non-transitory computer-readable medium described herein may further include operations, features, means, or instructions for receiving DCI indicating at least one precoder to be applied in the closed-loop MIMO scheme.

Some examples of the method, apparatuses, and non-transitory computer-readable medium described herein may further include operations, features, means, or instructions for applying the closed-loop MIMO scheme and the transparent diversity scheme applied to the uplink data to a demodulation reference signal (DMRS) associated with the uplink data; and transmitting the DMRS using the set of antenna ports.

Some examples of the method, apparatuses, and non-transitory computer-readable medium described herein may further include operations, features, means, or instructions for transmitting an SRS separately for each of the set of antenna ports.

A method for wireless communication at a base station. The method may include identifying that a UE is to use both a closed-loop MIMO scheme and a transparent diversity scheme to transmit uplink data using a set of antenna ports that include a set of groups of antenna ports, antenna ports within each group of antenna ports being phase coherent with each other antenna port belonging to the group of antenna ports and being phase incoherent with the antenna ports belonging to at least one other group of antenna ports; and transmitting, to the UE, an indication that the UE is to use the closed-loop MIMO scheme for the set of groups of antenna ports and the transparent diversity scheme among antenna ports belonging to different groups of antenna ports.

An apparatus for wireless communications is described. The apparatus may include a processor, memory in electronic communication with the processor, and instructions stored in the memory. The instructions may be executable by the processor to cause the apparatus to identify that a UE is to use both a closed-loop MIMO scheme and a transparent diversity scheme to transmit uplink data using a set of antenna ports that include a set of groups of antenna ports, antenna ports within each group of antenna ports being phase coherent with each other antenna port belonging to the group of antenna ports and being phase incoherent with the antenna ports belonging to at least one other group of antenna ports; and transmit, to the UE, an indication that the UE is to use the closed-loop MIMO scheme for the set of groups of antenna ports and the transparent diversity scheme among antenna ports belonging to different groups of antenna ports.

Another apparatus for wireless communications is described. The apparatus may include means for identifying that a UE is to use both a closed-loop MIMO scheme and a transparent diversity scheme to transmit uplink data using a set of antenna ports that include a set of groups of antenna ports, antenna ports within each group of antenna ports being phase coherent with each other antenna port belonging to the group of antenna ports and being phase incoherent with the antenna ports belonging to at least one other group of antenna ports; and means for transmitting, to the UE, an indication that the UE is to use the closed-loop MIMO scheme for the set of groups of antenna ports and the transparent diversity scheme among antenna ports belonging to different groups of antenna ports.

A non-transitory computer-readable medium storing code for wireless communications is described. The code may include instructions executable by a processor to identify that a UE is to use both a closed-loop MIMO scheme and a transparent diversity scheme to transmit uplink data using a set of antenna ports that include a set of groups of antenna ports, antenna ports within each group of antenna ports being phase coherent with each other antenna port belonging to the group of antenna ports and being phase incoherent with the antenna ports belonging to at least one other group of antenna ports; and transmit, to the UE, an indication that the UE is to use the closed-loop MIMO scheme for the set of groups of antenna ports and the transparent diversity scheme among antenna ports belonging to different groups of antenna ports.

In some examples of the method, apparatuses, and non-transitory computer-readable medium described herein, the indication that the UE is to use the closed-loop MIMO scheme and the transparent diversity scheme indicates that the UE is to apply the closed-loop MIMO scheme before the transparent diversity scheme.

Some examples of the method, apparatuses, and non-transitory computer-readable medium described herein may further include operations, features, means, or instructions for transmitting an indication that the uplink data is to be precoded for a first group of the set of groups of antenna ports according to a first precoder, and the uplink data is to be precoded for a second group of the set of groups antenna ports according to a second precoder different from the first precoder.

In some examples of the method, apparatuses, and non-transitory computer-readable medium described herein, the first precoder and the second precoder have a same rank.

In some examples of the method, apparatuses, and non-transitory computer-readable medium described herein, the indication that the UE is to use the closed-loop MIMO scheme and the transparent diversity scheme indicates that the UE is to apply the transparent diversity scheme before the closed-loop MIMO scheme.

In some examples of the method, apparatuses, and non-transitory computer-readable medium described herein, the uplink data includes a set of data streams corresponding to a set of layer.

In some examples of the method, apparatuses, and non-transitory computer-readable medium described herein, the transparent diversity scheme includes small delay cyclic delay diversity.

In some examples of the method, apparatuses, and non-transitory computer-readable medium described herein, the closed-loop MIMO scheme uses rank one precoding.

In some examples of the method, apparatuses, and non-transitory computer-readable medium described herein, the closed-loop MIMO scheme uses at least rank two precoding.

Some examples of the method, apparatuses, and non-transitory computer-readable medium described herein for transmitting the indication may further include operations, features, means, or instructions for transmitting radio resource control signaling that includes the indication that the UE is to use the closed-loop MIMO scheme and the transparent diversity scheme.

In some examples of the method, apparatuses, and non-transitory computer-readable medium described herein, the indication identifies an order in which the UE is to apply the closed-loop MIMO scheme and the transparent diversity scheme.

Some examples of the method, apparatuses, and non-transitory computer-readable medium described herein may further include operations, features, means, or instructions for transmitting DCI indicating a rank associated with the uplink data to which the closed-loop MIMO scheme is to be applied.

Some examples of the method, apparatuses, and non-transitory computer-readable medium described herein may further include operations, features, means, or instructions for transmitting DCI indicating at least one precoder for the UE to apply in the closed-loop MIMO scheme.

Some examples of the method, apparatuses, and non-transitory computer-readable medium described herein may further include operations, features, means, or instructions for selecting a precoder for the UE to apply in the closed-loop MIMO scheme; and transmitting an indication of the selected precoder to the UE.

BRIEF DESCRIPTION OF THE DRAWINGS

FIGS. 3A through 5 illustrate examples of a block diagram that supports hybrid closed-loop MIMO and transparent diversity scheme in NR in accordance with aspects of the present disclosure.

DETAILED DESCRIPTION

Figure 1:
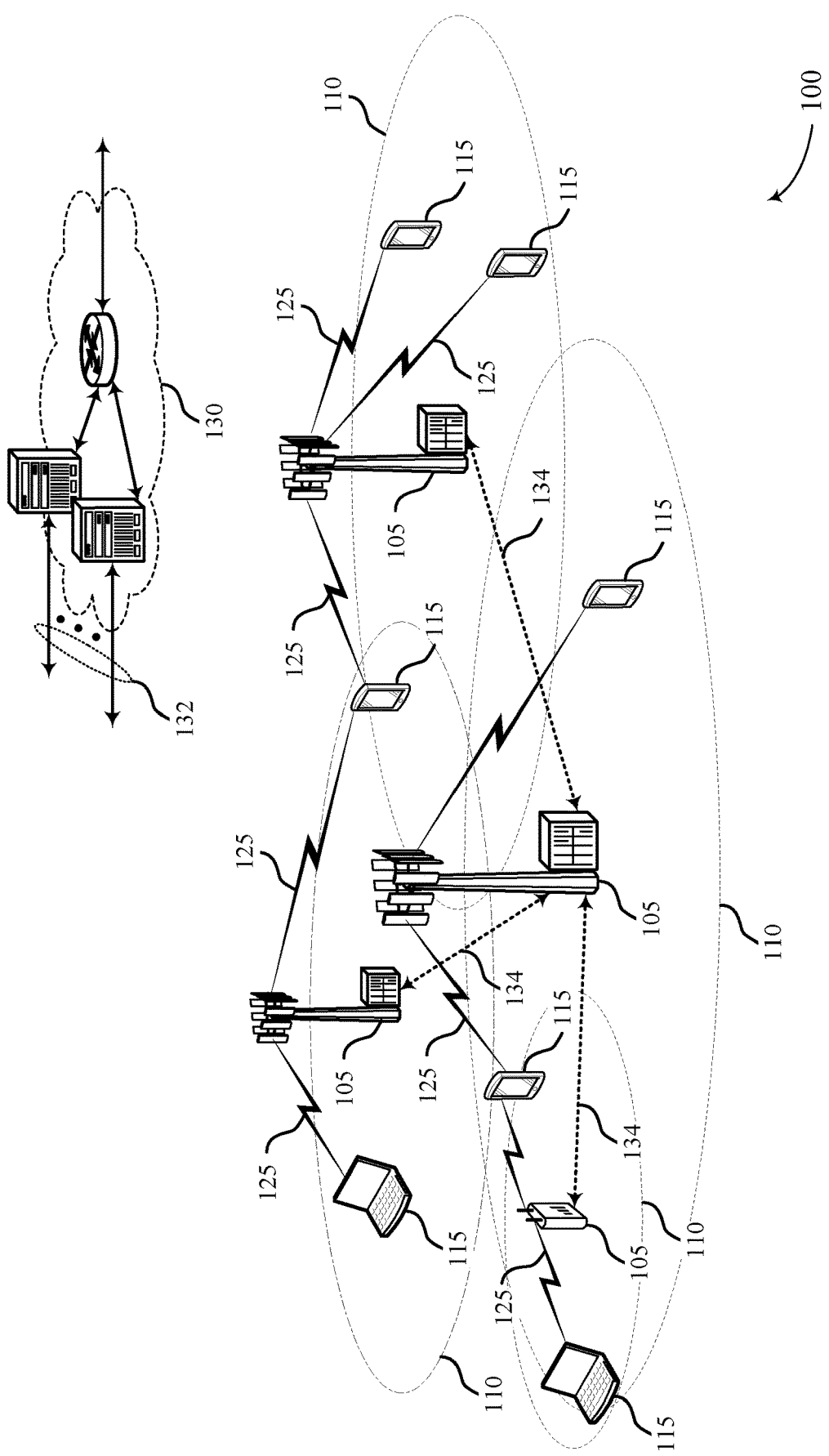
FIGS. 1 and 2 illustrate examples of a wireless communications system that support closed-loop multiple-input multiple-output (MIMO) and transparent diversity scheme in new radio (NR) in accordance with aspects of the present disclosure.

In some wireless communications systems such as multiple-input multiple-output (MIMO) systems, a base station and user equipment (UE) may use multiple antennas to achieve improved system performance, including improved system capacity (e.g., more UEs per cell) and improved coverage, as well as improved service provisioning, for example, higher per-UE data rates. The availability of multiple antennas at the base station and UE can also be used in different manners to achieve different objectives. For example, multiple antennas at the base station or UE can be used to provide additional diversity against fading on a radio channel, or to shape an overall antenna beam (e.g., transmit beam or receive beam respectively), or to create multiple parallel communication radio channels over a radio interface. This provides the possibility for increased bandwidth utilization without a corresponding reduction in power efficiency.

A base station and UE, in a MIMO system, may use multiple antennas for uplink (UL) and downlink (DL) communications. In some cases, the antennas of the base station or UE may be partially coherent. That is, different groups of antennas may be coherent or noncoherent. In the case that antennas of a first group of antennas is coherent with other antennas of that first group, and the antennas of a second group of antennas is coherent with other antennas of that second group, but the antennas of the second group are not coherent (noncoherent) with the antennas of the first group, the two groups of antennas may be said to be partially coherent. In other examples, three or more such groups of antennas may exist or be used, each group having two or more coherent antennas. In some techniques, a group of antennas that are coherent may be restricted from simultaneous transmissions with another group of antennas that are coherent, where the first group is noncoherent with the second group, limiting the base station's or UE's resource utilization (e.g., transmit power utilization). According to the techniques described herein, a UE (or a base station) may be configured to support simultaneous UL (or DL) transmissions by partially coherent antennas, in particular where antennas within each group are coherent, but the antennas are noncoherent between different groups.

In some cases, a base station may configure a UE to use both a closed-loop MIMO scheme and a transparent diversity scheme to support simultaneous transmission across groups of antennas that may be partially coherent and realizing the benefits associated with it (e.g., efficient resource utilization, spectral diversity, etc.). For example, a UE may receive an indication, in a downlink control information (DCI) message or via radio resource control (RRC) signaling, that the UE is to use both a closed-loop MIMO scheme and a transparent diversity scheme for UL transmission using a number of antenna ports associated with a number of groups of antenna ports.

Following the reception of the indication, the UE may apply both the closed-loop MIMO scheme and the transparent diversity scheme among the antenna ports within each group of the number of groups of antenna ports. That is, the closed-loop MIMO scheme may be applied within each group of antenna ports, and the transparent diversity scheme may be applied among the antenna ports in different groups of antenna ports. The order of applying the closed-loop MIMO scheme and a transparent diversity scheme may be different. In an example, the UE may first apply the closed-loop MIMO scheme and following with the transparent diversity scheme to the antenna ports within each group of the number of groups of antenna ports. Alternatively, in another example, the UE may first apply the transparent diversity scheme and then the closed-loop MIMO scheme to the antenna ports within each group of the number of groups of antenna ports. In some cases, first applying the transparent diversity scheme to the antenna ports among different groups of antenna ports may result in a number of virtual antenna ports. That is, applying the transparent diversity scheme to the antenna ports across different groups of antenna ports first may be to virtually combine multiple noncoherent antennas into a virtual antenna port. By applying a hybrid closed-loop MIMO scheme, as well as a transparent diversity scheme, the UE may fully realize its resources and decrease instances of unused resources. Additionally, by configuring the UE with the above scheme (e.g., hybrid closed-loop MIMO plus transparent diversity scheme) may result in improved spatial diversity for the MIMO system.

Aspects of the disclosure are initially described in the context of a wireless communications system. Aspects of the disclosure are also illustrated by and described with reference to block diagrams, tables, and process flows. Aspects of the disclosure are further illustrated by and described with reference to apparatus diagrams, system diagrams, and flowcharts that relate to hybrid closed-loop MIMO and transparent diversity schemes.

FIG. 1 illustrates an example of a wireless communications system 100 that supports hybrid closed-loop MIMO and transparent diversity scheme in NR in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, MIMO communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

In some cases, base stations 105 and/or UEs 115 may perform open-loop MIMO or closed-loop MIMO. In MIMO, the transmitter (e.g., the UE 115 for uplink, and the base station 105 for downlink) may use a precoding matrix to match (or attempt to match) a spatial channel experienced between the UE 115 and the base station 105. In closed-loop MIMO, the precoding matrix may be changed based on feedback signaling from the UE 115 to the base station 105. That is, in closed-loop MIMO the base stations 105 may use channel information (e.g., obtained via measurements) to select a precoding matrix. In an example, base station 105 may select or change a precoding matrix based on channel state information (CSI) report received from a UE 115. An indication of which precoding matrix for the UE 115 to use may be indicated to a UE 115, for example, in DCI.

In open-loop MIMO, feedback signaling is not provided by the base station 105 nor UEs 115 to determine the channel information.

In some cases, base stations 105 and/or UEs 115 may apply a diversity scheme. Examples of diversity schemes include cyclic delay diversity (CDD), frequency switch transmit diversity (FSTD), space-frequency block coding (SFBC), and space-time block coding (STBC). In a transparent diversity scheme, a transmitter may apply a diversity scheme at the transmitter, the specific parameters associated with the diversity scheme being unknown to the receiver (and thus transparent to the receiver). For uplink, a UE 115 may apply a diversity scheme whose parameters are not known to the base station 105. In the case of a transparent diversity scheme including cyclic delay diversity, a UE 115 may apply a phase shift θ, the value of which is unknown to the base station 105.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying predetermined amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARM) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f = 307,200 \, T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected (CCs) component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation (CA) configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a CA configuration. CA may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 and UE 115 may use multiple antennas for UL and DL communications. In some cases, the antennas of the base station 105 or UE 115 may be partially coherent. That is, different groups of antennas may be coherent or noncoherent. In the case that one group of antennas is coherent and another group is also coherent, but noncoherent with the first group of antennas, the two groups of antennas may be said to be partially coherent. In some techniques, a group of antennas that are coherent may be restricted from simultaneous transmissions with another group of antennas that are coherent where the antennas of the groups are noncoherent between them, limiting the base station's 105 or UE's 115 resource utilization (e.g., transmit power utilization). According to the techniques described herein, a UE 115 (or a base station 105 in some examples) may be configured to support simultaneous UL (or DL) transmissions on groups of antennas (e.g., multiple groups (e.g., pairs, triplets, etc.) of coherent antennas) that may be partially coherent within their group, but noncoherent with antennas of another antenna group. In some cases, a base station 105 may configure a UE 115 to use both a closed-loop MIMO scheme and a transparent diversity scheme to support simultaneous transmission across groups of antennas that may be partially coherent, and realizing the benefits associated with it (e.g., efficient resource utilization, spectral diversity, etc.).

Figure 2:
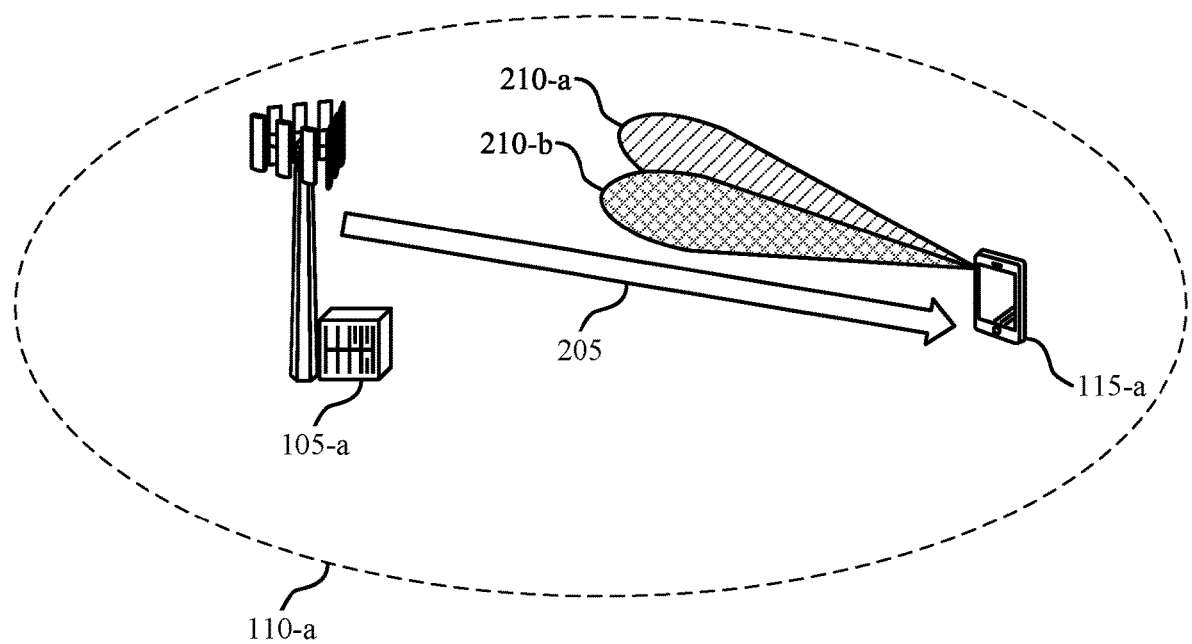

FIG. 2 illustrates an example of a wireless communications system 200 that supports hybrid closed-loop MIMO and transparent diversity schemes in NR in accordance with various aspects of the present disclosure. In some examples, the wireless communications system 200 may implement aspects of the wireless communications system 100. The wireless communications system 200 may include a base station 105-a and a UE 115-a, which may be examples of the corresponding devices described with reference to FIG. 1. For example, the wireless communications system 200 may be an NR MIMO system.

The base station 105-a may perform a communication procedure (e.g., an RRC procedure, such as a cell acquisition procedure, random access procedure, RRC connection procedure, RRC configuration or reconfiguration procedure, etc.) with the UE 115-a. The base station 105-a and UE 115-a may be configured with multiple antennas, which may be used for directional or beamformed transmissions. As part of the communication procedure, the base station 105-a may identify that the UE 115-a is to use both a closed-loop MIMO scheme and a transparent diversity scheme for UL transmissions. In some examples, the UE 115-a may determine a UE capability, which may include an indication of groups of antenna ports and information corresponding to coherence and non-coherence. For example, a UE capability may indicate that a group of antenna ports related to UL transmit beam 210-a may be coherent or a group of antenna ports related to UL transmit beam 210-b may be noncoherent, or both. This UE capability may be provided to the base station 105-a during the communication procedure, which the base station 105-a may use to identify that the UE 115-a is to use both the closed-loop MIMO scheme and the transparent diversity scheme for UL transmissions.

Following this identification operation, the base station 105-a may provide an indication (e.g., in control information) to the UE 115-a to use both the closed-loop MIMO scheme and the transparent diversity scheme for UL transmissions. In an example, the base station 105-a may provide the indication via RRC signaling 205. Alternatively, the base station 105-a may provide the indication in DCI message on a physical downlink control channel (PDCCH). In some cases, the indication may provide an order for performing the closed-loop MIMO scheme and the transparent diversity scheme. An example order may include performing the closed-loop MIMO scheme at a first time and performing the transparent diversity scheme at a second time after the first time. Another example order may include performing the transparent diversity scheme at a first time and then the closed-loop MIMO scheme at a second time after the first time.

In some cases, as part of the communication procedure, the base station 105-a may also configure the UE 115-a with one or more transmission parameters for an UL transmission (e.g., a data stream) associated with at least one of the UL transmit beam 210-a or the UL transmit beam 210-b, for example. A transmission parameter may include a modulation coding scheme (MCS), a rank indicator (RI), a precoder (e.g., precoding matrix indicator (PMI)), resource allocation (e.g., time and frequency resources), or the like. A transmission parameter may additionally, or alternatively be based on a rank of an UL transmission.

In some cases, an UL transmission may include a set of data streams corresponding to a set of layers. For example, an UL transmission may be a rank-1 (i.e., one layer of data) or a rank-2 (i.e., two layers of data) or a higher rank (i.e., rank-4, rank-4, etc.). In this example, a precoder for an UL transmission may be selected based on the rank of the UL transmission. In some cases, each group of antennas ports may have different transmission parameters. For example, the base station 105-a may schedule a first precoder matrix for a first group of antenna ports that may be coherent and a second precoder matrix that is different from the first precoder matrix for a second group of antenna ports that may be coherent, where the first group of antenna ports may be noncoherent with the second group of antenna ports.

The precoder for an UL transmission may be selected according to a closed-loop precoding scheme or an open-loop precoding scheme. In a closed-loop precoding scheme, the base station 105-a may select a suitable transmission rank and a corresponding precoder matrix based on measurements on reference signals (RSs) transmitted from the UE 115-a (e.g., demodulation reference signals (DMRSs), sounding reference signals (SRSs)). The base station 105-a may explicitly signal to the UE 115-a a selected rank and corresponding precoder matrix for an UL transmission. For example, the base station 105-a may transmit information (e.g., control information) that identifies the transmission rank, as well as the selected precoder matrix in a DCI message to the UE 115-a.

In some cases, to reduce the signaling between the base station 105-a and the UE 115-a for both DL and UL transmissions, a codebook may be configured for each transmission rank for a given number of antenna ports. In this case, both the base station 105-a when selecting an actual precoder matrix to use for UL transmission from the UE 115-a, and the UE 115-a when generating the uplink signal, may select a precoder matrix from the corresponding codebook. As such, in either case that an UL transmission is a rank-1 or rank-2, the UL transmission may be closed-loop multiplexed according to the selected precoder matrix. Alternatively, in an open-loop precoding scheme, the UE 115-a may not rely on signaling from the base station 105-a to select precoder matrix.

The UE 115-a may receive the indication (e.g., in control information) to use both the closed-loop MIMO scheme and the transparent diversity scheme for UL transmissions, for example, via RRC signaling 205 or in a DCI message carried on a PDCCH. With reference to the transmission parameters, the UE 115-a may also receive information corresponding to one or more precoder matrices for precoding an UL transmission (i.e., performing closed-loop MIMO). For example, the UE 115-a may identify a first precoder matrix for precoding UL data on a first group of antenna ports (e.g., corresponding to UL transmit beam 210-a) and identify a second precoder matrix for precoding UL data on a second group of antenna ports (e.g., corresponding to UL transmit beam 210-b). In some examples, the first group of antenna ports and the second group of antenna ports may have the same precoder matrix.

In some cases, the phase coherence can be maintained between antenna ports (e.g., antennas) included in each antenna port group (e.g., antenna group). The first group of antenna ports and the second group of antenna ports may be partially coherent. For example, the first group of antenna ports may be coherent with each other antenna port of the first group of antenna ports and noncoherent with the second group of antenna ports. The second group of antenna ports may be coherent with each other antenna port of the second group of antenna ports and noncoherent with the first group of antenna ports. After precoding the different groups of antenna ports, the UE 115-a may apply a transparent diversity scheme among each antenna port of the groups. An example of a transparent diversity scheme may include a small cyclic delay diversity (CDD), which applies cyclic shifts to different antenna ports. As a result, CDD may be applicable to OFDM-based and DFTS-OFDM-based transmissions. In this case when the UE 115-a first perform closed-loop MIMO and then CDD, the UE 115-a may be capable of simultaneous UL transmissions on both UL transmit beam 210-a and 210-b. That is, UE 115-a is capable of transmitting same UL data on both UL transmit beam 210-a and 210-b. Alternatively, in the case that the UE 115-a first performs CDD and then closed-loop MIMO, similar benefits such as spectral diversity may be realized. Except that when the UE 115-a performs the closed-loop MIMO, it is performed on virtual antenna ports. That is, the CDD is applied among the antenna ports in different antenna groups to virtually combine multiple noncoherent antennas into groups of virtual antenna ports and perform the UL transmission using the groups of virtual antenna ports. In some cases, the small delay CDD may be zero. That is, the UE 115-a may apply a small delay CDD with zero cyclic shift (e.g., in time domain) or zero phase shift (e.g., in frequency domain) as part of the transparent diversity scheme.

The UE 115-a may apply the same scheme for DMRS transmissions and data (e.g., the same scheme for a DMRS transmission as the scheme used for the corresponding uplink data). In the UL, the UE 115-a may transmit DMRS at the same time as the PUSCH and PUCCH, as a phase reference for use in channel estimation. The UE 115-a may also transmit SRS at times configured by the base station 105-a, as a power reference in support frequency-dependent scheduling and precoder selection. In some cases, the UE 115-a may apply the transparent diversity scheme among (e.g., virtually combine) each antenna port of a first group of antenna ports and a corresponding antenna port of a second group of antenna ports to generate a set of virtual SRS ports, and transmit an SRS separately for each of the set of virtual antenna ports.

By applying a hybrid closed-loop MIMO and transparent diversity scheme, the UE 115-a may fully utilize its resources and decrease instances of unused resources. Additionally, configuring the UE 115-a with the above scheme (e.g., hybrid closed-loop MIMO plus transparent diversity scheme) may result in improved spatial diversity for the wireless communications system 200.

Figures 3A, 3B:
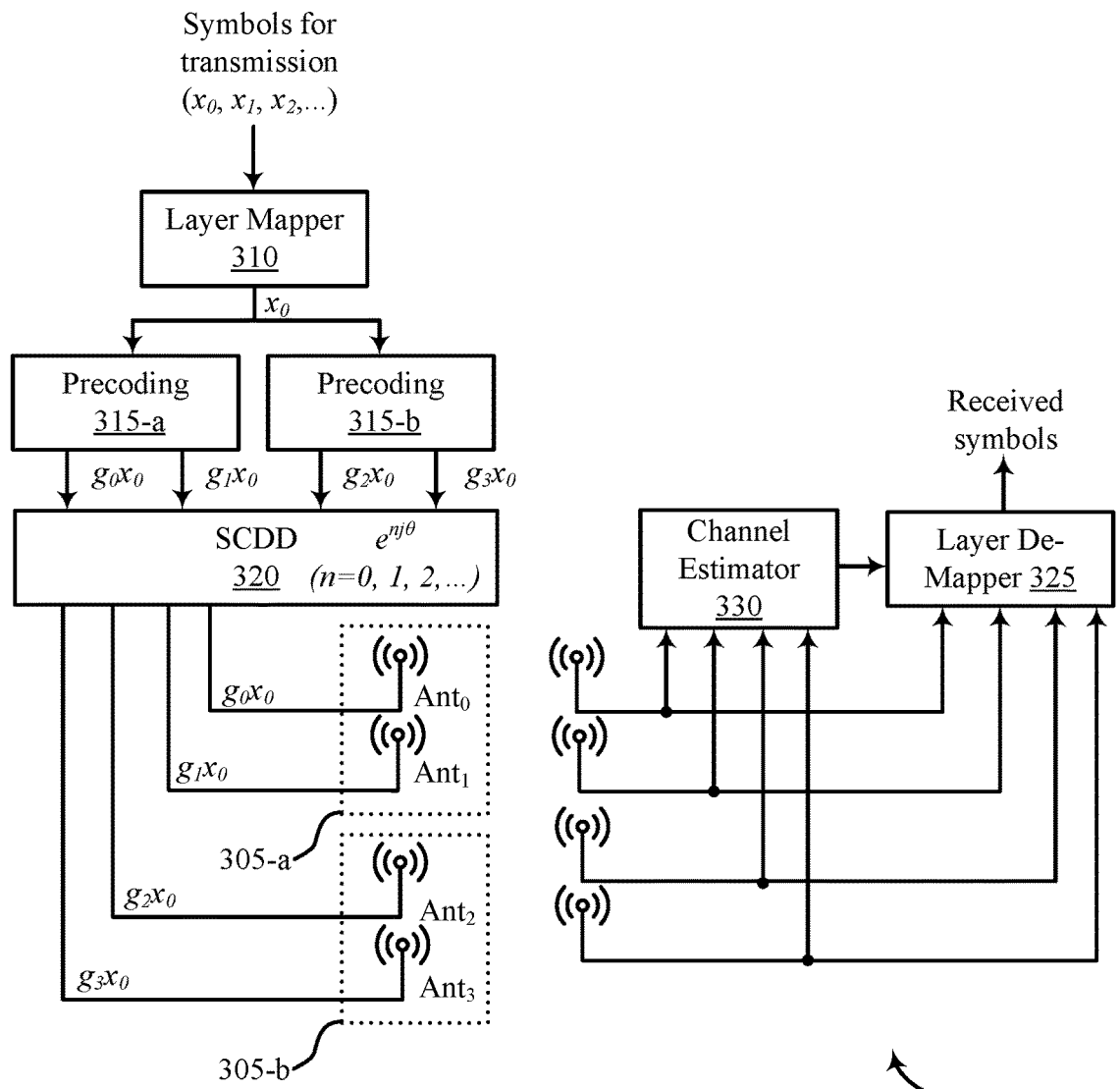

FIG. 3A illustrates an example of a block diagram 300-a that supports hybrid closed-loop MIMO and transparent diversity schemes in NR in accordance with various aspects of the present disclosure. In some examples, the block diagram 300-a may implement aspects of the wireless communications systems 100 and 200. For example, the block diagram 300-a may depict performing a closed-loop MIMO scheme following with a transparent diversity scheme. In this example, a UE may sound all antenna ports separately and select precoders based on the sounding from all the antenna ports.

The block diagram 300-a may include operations between a UE and a base station, which may be examples of the corresponding devices described with reference to FIGS. 1 and 2. The operations depicted in block diagram 300-a may be transmitted in a different order than the exemplary order shown, or the operations performed may be performed in different orders or at different times. Some operations may also be left out of the block diagram 300-a, or other operations may be added to the block diagram 300-a.

A UE, which may be an example of the corresponding device described with reference to FIGS. 1 and 2 may use multiple antennas to realize multiple parallel data streams, so as to increase a data rate and realize spectral diversity. In the depicted example, a UE may include a layer mapper 310, a precoding block 315-a, a precoding block 315-b, an SCDD block 320. A base station, which may be an example of the corresponding device described with reference to FIGS. 1 and 2 may also use multiple antennas to realize multiple parallel data streams, so as to increase a data rate and realize spectral diversity. In the depicted example, the base station may include a layer de-mapper 325, and a channel estimator 330.

At the UE, the layer mapper 310 may receive modulated symbol stream (e.g., a data stream) for UL transmission. For example, the modulated symbol stream may be a sequence of UL modulated symbols (e.g., $x_0, x_1, x_2, \ldots$). The layer mapper 310 may map the modulated symbols (e.g., $x_0, x_1, x_2, \ldots$) to one or more layers, where the number of layers corresponds to the selected rank. In some examples, a transmission rank may be greater than 1. The layer mapper 310 may map the modulated symbols to two or more layers for transmission. In a two layer example (e.g., rank 2 transmission), half of the modulated symbols (e.g., $x_0, x_2, x_4, \ldots$) may be mapped to layer 1 for transmission, and the other half of the modulated symbols (e.g., $x_1, x_3, x_5, \ldots$) may be mapped to layer 2 for transmission (e.g., as further illustrated and described with reference to FIGS. 4A and 4B).

The precoding block 315-a and the precoding block 315-b may receive the modulated symbols and pre-code each symbol based on a precoder matrix. The precoder matrix may be selected by the base station and provided to the UE. For example, two precoders (precoder matrices) for two different groups of antenna ports (e.g., antenna group 305-a and antenna group 305-b) may be $$\begin{bmatrix} g_0 \\ g_1 \end{bmatrix} \text{ and } \begin{bmatrix} g_2 \\ g_3 \end{bmatrix},$$

where $g_0$, $g_1$, $g_2$, and $g_3$ are elements of the respective precoders. The output from the precoding block 315-a and the precoding block 315-b for each symbol of the modulated symbols may be pre-coded with the corresponding precoder matrix. For a first symbol $x_0$, for example, the output from the precoding block 315-a may be $g_0x_0$ and $g_1x_0$ and the precoding block 315-b may be $g_2x_0$ and $g_3x_0$. The precoding block 315-a and the precoding block 315-b may forward the pre-coded symbols to the SCDD block 320 to apply transparent diversity. For example, the SCDD block 320 may apply CDD to the pre-coded symbols. In some examples, the SCDD block 320 may only apply CDD to introduce a delay between pre-coded symbols corresponding to antenna ports that are noncoherent. For example, the SCDD block 320 may apply CDD (e.g., phase-shift in the frequency domain) the pre-coded symbols associated with the antenna ports of antenna group 305-b relative to antenna ports of antenna group 305-a because such antenna ports may be noncoherent with the antenna ports of antenna group 305-a. A phase-shift in the frequency domain may result in a cyclic-shift in the time domain. The output signals from SCDD block 320 may then be mapped to antenna ports in the antenna group 305-a and antenna group 305-b.

FIG. 3B illustrates an example of a table 300-b that supports hybrid closed-loop MIMO and transparent diversity schemes in NR in accordance with various aspects of the present disclosure. In some examples, the block diagram 300-b may represent aspects of the block diagram 300-a. For example, the block diagram 300-b may depict an output signal after performing a closed-loop MIMO scheme following with a transparent diversity scheme for antenna ports $Ant_0$, $Ant_1$, $Ant_2$, and $Ant_3$ over the course of four frequency tones. With reference to FIG. 3A, antenna port$_0$ and antenna port$_1$ may belong to antenna group 305-a. The antenna port$_0$ and antenna port$_1$ may also be coherent. The antenna port$_2$ and antenna port$_3$ may belong to antenna group 305-b. The antenna ports of antenna group 305-a may be noncoherent with the antenna ports of antenna group 305-b, such that antenna port$_0$ and antenna port$_2$ may be noncoherent, antenna port$_1$ and antenna port$_3$ may be noncoherent, and so on.

As depicted in FIG. 3B, the output signal corresponding to the modulated symbol stream may be mapped to different frequency tones and different antenna ports of each antenna group 305-a and 305-b. For example, antenna port$_0$ may transmit $g_0x_0$ on a first frequency tone, $g_0x_1$ on a second frequency tone, $g_0x_3$ on a third frequency tone, and $g_0x_3$ on a fourth frequency tone, and antenna port$_1$ may transmit $g_1x_0$ on a first frequency tone, $g_1x_1$ on a second frequency tone, $g_1x_3$ on a third frequency tone, and $g_1x_3$ on a fourth frequency tone. The modulated symbols mapped to antenna port$_2$ and antenna port$_3$ may have a phase-shift associated with them, as a result of applying CDD because the antenna port$_2$ and antenna port$_3$ being noncoherent with the antenna port$_0$ and antenna port$_1$. For example, antenna port$_2$ may transmit $g_2x_0$ on a first frequency tone, $g_2x_1e^{j\theta}$ on a second frequency tone, $g_2x_2e^{2j\theta}$ on a third frequency tone, and $g_2x_3e^{3j\theta}$ on a fourth frequency tone, and antenna port3 may transmit $g_3x_0$ on a first frequency tone, $g_3x_1e^{j\theta}$ on a second frequency tone, $g_3x_2e^{2j\theta}$ on a third frequency tone, and $g_3x_3e^{3j\theta}$ on a fourth frequency tone. As a result, the data stream may be transmitted using both antenna group 305-a and 305-b simultaneously.

With reference to FIG. 3A, at the base station, the channel estimator 330 may calculate a channel estimation corresponding to a resource allocation of the UE. The layer de-mapper 325 may perform the complementary operation of the layer mapper 310 by extracting data symbols from one or more layers, if applicable. By applying a hybrid scheme including a closed-loop MIMO scheme and a transparent diversity scheme, a UE may fully utilize its resources and provide a single layer UL transmission, while improving spatial diversity for a wireless communications system.

Figures 4A, 4B:
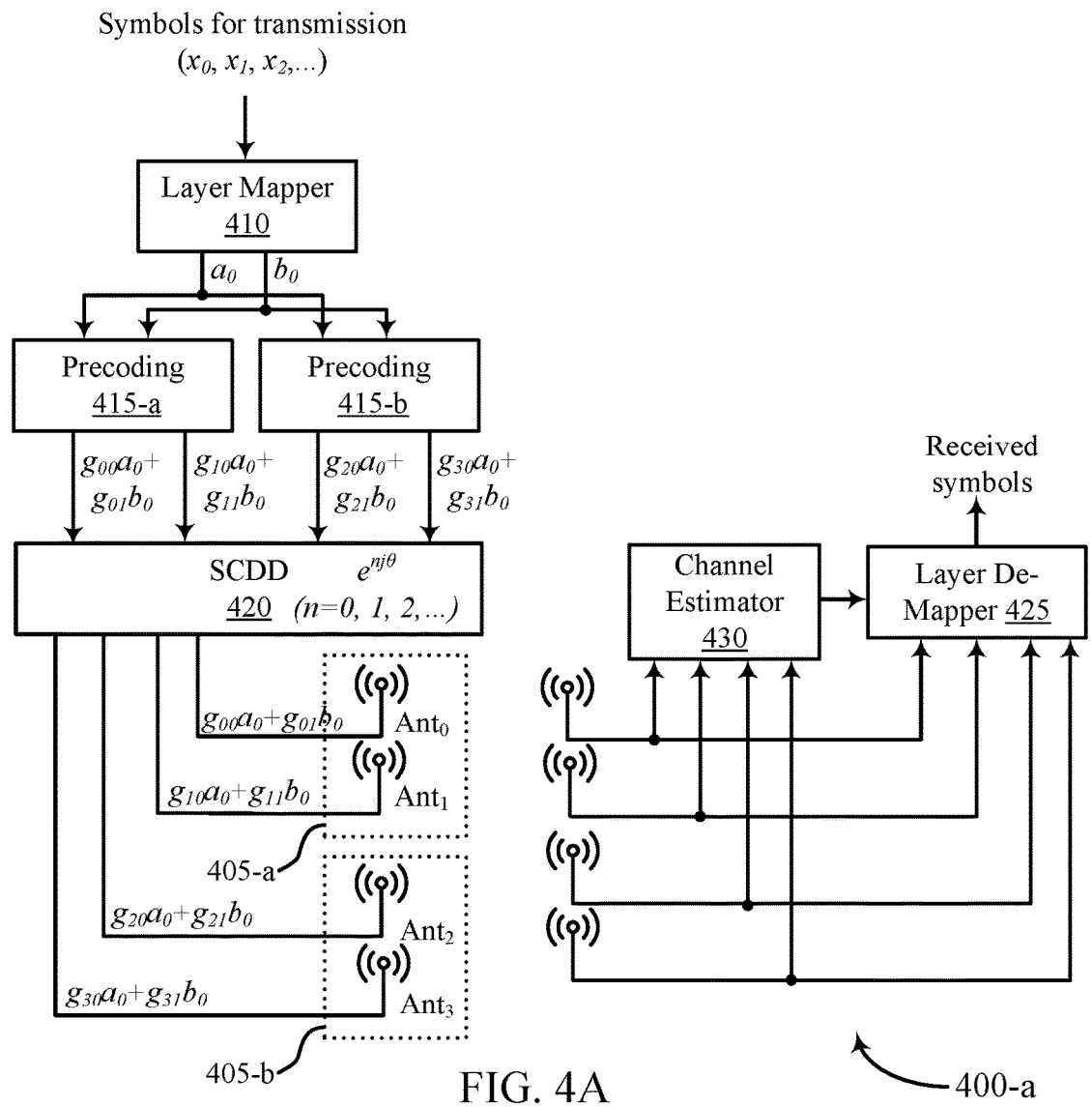

FIG. 4A illustrates an example of a block diagram 400-a that supports hybrid closed-loop MIMO and transparent diversity schemes in NR in accordance with various aspects of the present disclosure. In some examples, the block diagram 400-a may implement aspects of the wireless communications systems 100 and 200. For example, the block diagram 400-a may depict performing a transparent diversity scheme following a closed-loop MIMO scheme. The block diagram 400-a may include operations between a UE and a base station, may be examples of the corresponding devices described with reference to FIGS. 1 and 2. The operations depicted in block diagram 400-a may be transmitted in a different order than the exemplary order shown, or the operations performed may be performed in different orders or at different times. Some operations may also be left out of the block diagram 400-a, or other operations may be added to the block diagram 400-a.

A UE, which may be an example of the corresponding device described with reference to FIGS. 1 and 2 may use multiple antennas to realize multiple parallel data streams, so as to increase a data rate and realize spectral diversity. In the depicted example, a UE may include a layer mapper 410, a precoding block 415-a, a precoding block 415-b, an SCDD block 420. A base station, which may be an example of the corresponding device described with reference to FIGS. 1 and 2 may also use multiple antennas to realize multiple parallel data streams, so as to increase a data rate and realize spectral diversity. In the depicted example, the base station may include a layer de-mapper 425 and a channel estimator 430.

At the UE, the layer mapper 410 may receive a data stream for UL transmission, for example a sequence of modulated UL symbols (e.g., $x_0, x_1, x_2, \ldots$). The layer mapper 410 may map the modulated symbols to one or more layers, where the number of layers depends on a rank. In some examples, a transmission rank may be greater than 1. The layer mapper 410 may map the modulated symbols (e.g., $x_0, x_1, x_2, \ldots$) to two or more layers for transmission where, a first data stream on a first layer may be a sequence of modulated symbols (e.g., $a_0, a_1, a_2, \ldots$) and a second data stream on the second layer may be another sequence of modulated symbols (e.g., $b_0, b_1, b_2, \ldots$). In a two-layer example (e.g., rank 2 transmission), the first data stream may be mapped to layer 1 for transmission, and the second data stream may be mapped to layer 2 for transmission.

The precoding block 415-a and the precoding block 415-b may receive modulated symbols of the data streams and pre-code the modulated symbols based on a precoder matrix. The precoder matrix may be selected by the base station and provided to the UE. For example, two precoder matrices for two different groups of antenna ports (e.g., antenna group 405-a and antenna group 405-b) may be $$\begin{bmatrix} g_{00} g_{01} \\ g_{10} g_{11} \end{bmatrix} \text{ and } \begin{bmatrix} g_{20} g_{21} \\ g_{30} g_{31} \end{bmatrix},$$

where $g_{00}, g_{01}, g_{10}, g_{11}, g_{20}, g_{21}, g_{30}$ and $g_{30}$ are elements of the respective precoders. The output from the precoding block 415-a and the precoding block 415-b for each symbols of the data streams may be pre-coded with the corresponding precoder matrix. For a first symbol $a_0$ and first symbol $b_0$, for example from the first data stream and the second data stream, the output from the precoding block 415-a may be $g_{00}a_0+g_{01}b_0$ and $g_{10}a_0+g_{11}b_0$ and the precoding block 415-b may be $g_{20}a_0+g_{21}b_0$, $g_{30}a_0+g_{31}b_0$. The precoding block 415-a and the precoding block 415-b may provide the pre-coded symbols to the SCDD block 320 to apply transparent diversity. For example, the SCDD block 320 may apply CDD to the pre-coded symbols. In some examples, the SCDD block 320 may only apply CDD to introduce a delay between pre-coded symbols corresponding to antenna ports that are noncoherent. For example, the SCDD block 320 may apply CDD (e.g., phase-shift in the frequency domain) the pre-coded symbols associated with the antenna ports of antenna group 405-b relative to antenna ports of antenna group 405-a because such antenna ports may be noncoherent with the antenna ports of antenna group 305-a. The output signal from SCDD block 320 may then be mapped to antenna ports in the antenna group 405-a and antenna group 405-b.

FIG. 4B illustrates an example of a table 400-b that supports hybrid closed-loop MIMO and transparent diversity schemes in NR in accordance with various aspects of the present disclosure. In some examples, the block diagram 400-b may represent aspects of the block diagram 400-a. For example, the block diagram 400-b may depict an output signal after performing a closed-loop MIMO scheme following with a transparent diversity scheme for antenna ports $Ant_0$, $Ant_1$, $Ant_2$, and $Ant_3$ over the course of four tones. With reference to FIG. 4A, antenna $port_0$ and antenna $port_1$ may belong to antenna group 405-a. The antenna ports of antenna group 405-a may be noncoherent with the antenna ports of antenna group 405-b, such that antenna $port_0$ and antenna $port_2$ may be noncoherent, antenna $port_1$ and antenna $port_3$ may be noncoherent, and so on.

As depicted in FIG. 4B, the output signals corresponding to the data streams may be mapped to different frequency tones and different antenna ports of each antenna group 405-a and 405-b. For example, antenna $port_0$ may transmit $g_{00}a_0+g_{01}b_0$ on a first frequency tone, $g_{00}a_1+g_{01}b_1$ on a second frequency tone, $g_{00}a_2+g_{01}b_2$ on a third frequency tone, and $g_{00}a_3+g_{01}b_3$ on a fourth frequency tone, and antenna $port_1$ may transmit $g_{10}a_0+g_{11}b_0$ on a first frequency tone, $g_{10}a_1+g_{11}b_1$ on a second frequency tone, $g_{10}a_2+g_{11}b_2$ on a third frequency tone, and $g_{10}a_3+g_{11}b_3$ on a fourth frequency tone. The symbols mapped to antenna $port_2$ and antenna $port_3$ may have a phase-shift associated with them, as a result of applying CDD because the antenna $port_2$ and antenna $port_3$ being noncoherent with the antenna $port_0$ and antenna $port_1$. For example, antenna $port_2$ may transmit $g_{20}a_0+g_{21}b_0$ on a first frequency tone, $(g_{20}a_1+g_{21}b_1)e^{j\theta}$ on a second frequency tone, $(g_{20}a_2+g_{21}b_2)e^{2j\theta}$ on a third frequency tone, and $(g_{20}a_3+g_{21}b_3)e^{3j\theta}$ on a fourth frequency tone, and antenna port 3 may transmit $g_{30}a_0+g_{31}b_0$ on a first frequency tone, $(g_{30}a_1+g_{31}b_1)e^{j\theta}$ on a second frequency tone, $(g_{30}a_2+g_{31}b_2)e^{2j\theta}$ on a third frequency tone, and $(g_{30}a_3+g_{31}b_3)e^{3j\theta}$ on a fourth frequency tone. As a result, the data stream may be transmitted using both antenna group 405-a and 405-b simultaneously.

With reference to FIG. 4A, at the base station, the channel estimator 430 may calculate a channel estimation corresponding to a resource allocation of the UE. The layer de-mapper 425 may perform the complementary operation of the layer mapper 410 by extracting symbols from one or more layers. By applying a hybrid closed-loop MIMO and transparent diversity scheme, a UE may fully utilize its resources and provide multiple layer UL transmissions, while improving spatial diversity for a wireless communications system.

Figure 5:
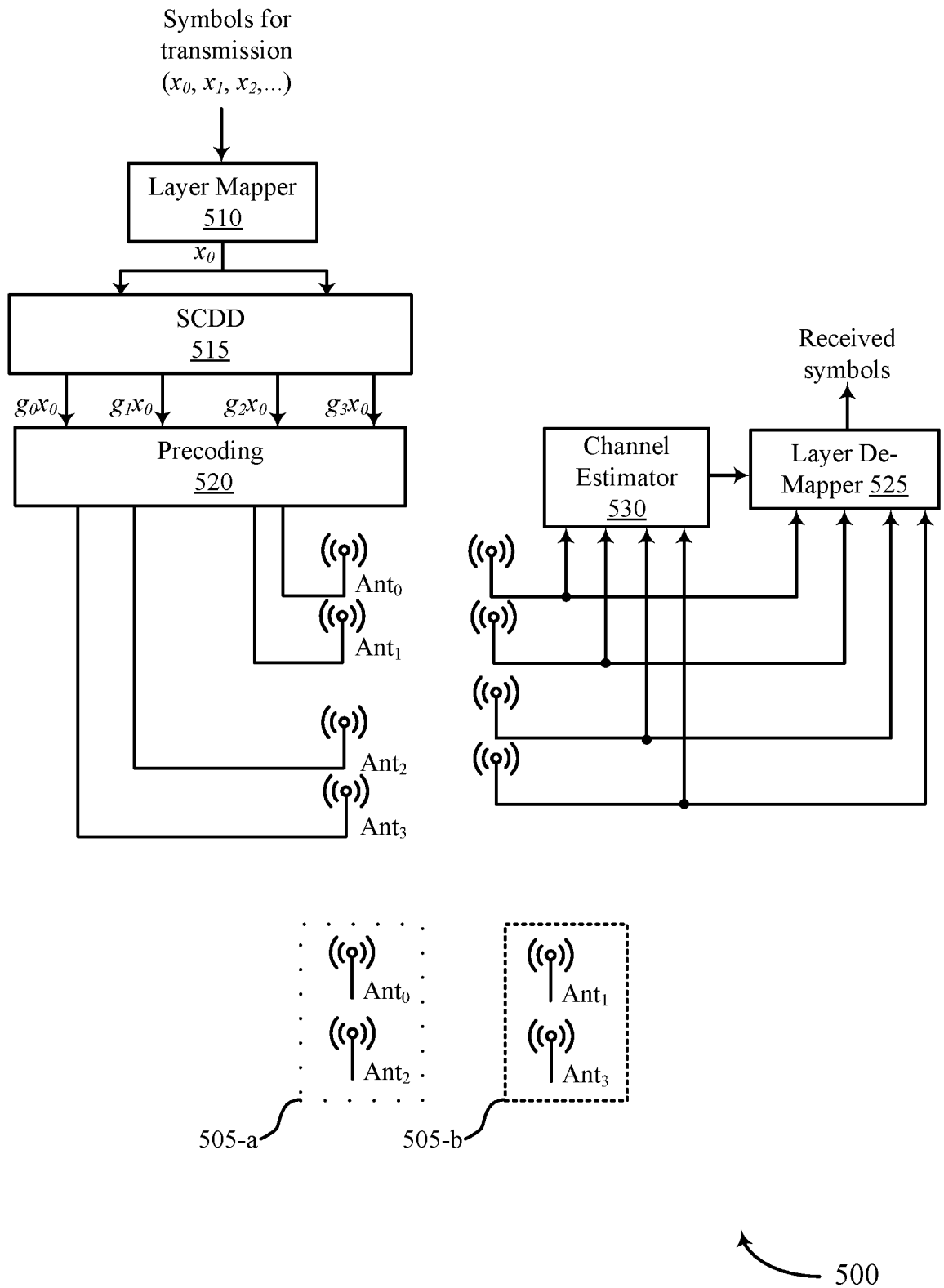

FIG. 5 illustrates an example of a block diagram 500 that supports hybrid closed-loop MIMO and transparent diversity schemes in NR in accordance with various aspects of the present disclosure. In some examples, the block diagram 500 may implement aspects of the wireless communications systems 100 and 200. For example, the block diagram 500 may depict performing a transparent diversity scheme following with a closed-loop MIMO scheme. In this example, a UE may sound two virtual antenna ports separately and select a precoder based on the sounding from the two virtual antenna ports.

The block diagram 500 may include operations between a UE and a base station, which may be examples of the corresponding devices described with reference to FIGS. 1 and 2. The operations depicted in block diagram 500 may be transmitted in a different order than the exemplary order shown, or the operations performed may be performed in different orders or at different times. Some operations may also be left out of the block diagram 500, or other operations may be added to the block diagram 500.

A UE, which may be an example of the corresponding device described with reference to FIGS. 1 and 2 may use multiple antennas to realize multiple parallel data streams, so as to increase a data rate and realize spectral diversity. In the depicted example, a UE may include a layer mapper 510, an SCDD block 515, and a precoding block 520. A base station, which may be an example of the corresponding device described with reference to FIGS. 1 and 2 may also use multiple antennas to realize multiple parallel data streams, so as to increase a data rate and realize spectral diversity. In the depicted example, the base station may include a layer de-mapper 525 and a channel estimator 530.

At the UE, the layer mapper 510 may receive a data stream for UL transmission. For example, the data stream may be a sequence of UL symbols (e.g., $x_0, x_1, x_2, \ldots$), which may be modulated. The layer mapper may map the modulated symbols to one or more layers, where the number of layers depends on a rank.

The layer mapper 510 may forward the pre-coded symbols to the SCDD block 515 for transparent diversity. The SCDD block 515 may apply CDD to the symbols to generate a set of virtual antenna ports (e.g., virtual antenna port group 505-a and virtual antenna port group 505-b), which may be referred to as a virtual antenna port group or a virtual antenna group. In some examples, the SCDD block 515 may only apply CDD to symbols from antenna ports that are noncoherent, for example, the SCDD block 515 may apply CDD (e.g., phase-shift in the frequency domain) among symbols associated with antenna port$_0$ and antenna port$_2$, and among symbols associated with antenna port$_1$ and antenna port$_3$ because antenna port$_0$ and antenna port$_2$ are noncoherent pair of antenna ports, and antenna port$_1$ and antenna port$_3$ are a noncoherent pair of antenna ports. The output signal (e.g., including phase-shifted bits) from SCDD block 515 associated with the virtual antenna ports (e.g., virtual antenna port group 505-a and virtual antenna port group 505-b) may then be provided to the precoding block 520. The output signal from SCDD block 515 associated with virtual antenna port group 505-a may be for antenna port$_1$ $x_0, x_1, x_2, \ldots$, and antenna port$_1$ $x_0, x_1, x_2, \ldots$, and the output signal from SCDD block 515 associated with virtual antenna port group 505-b may for antenna port$_2$ $x_0, x_1 e^{j\theta}, x_2 e^{2j\theta}, \ldots$, and for antenna port$_3 x_0, x_1 e^{j\theta}, x_2 e^{2j\theta}$. The precoding block 520 may receive modulated symbols of the data stream and pre-code each symbol based on a precoder matrix. That is, the precoding block 520 may apply a precoder on the virtual antenna ports (e.g., virtual antenna port group 505-a and virtual antenna port group 505-b) to obtain a pre-coded data stream for each virtual antenna port. The pre-coded output signal for each virtual antenna port may be for antenna port$_1$ $g_0 x_0, g_0 x_1, g_0 x_2, \ldots$, antenna port$_1$ $g_1 x_0, g_1 x_1, g_1 x_2, \ldots$, for antenna port$_2$ $g_0 x_0, g_0 x_1 e^{j\theta}, g_0 x_2 e^{2j\theta}, \ldots$, and for antenna port$_3 g_1 x_0, g_1 x_1 e^{j\theta}, g_1 x_2 e^{2j\theta}$. The precoder matrix may be selected by the base station and provided to the UE. The pre-coded data streams including the symbols (e.g., $x_0, x_1, x_2, \ldots$) may then be mapped to antenna ports in the virtual antenna port group 505-a and virtual antenna port group 505-b, or both.

At the base station, the channel estimator 530 may calculate a channel estimation corresponding to a resource allocation of the UE. The layer de-mapper 525 may perform the complementary operation of the layer mapper 510 by extracting symbols from one or more layers. By applying a transparent diversity scheme to symbols of a data stream and then applying hybrid closed-loop MIMO scheme, may allow a UE to utilize different antenna ports across different groups of virtual antenna ports, while improving spatial diversity for a wireless communications system.

Figure 6:
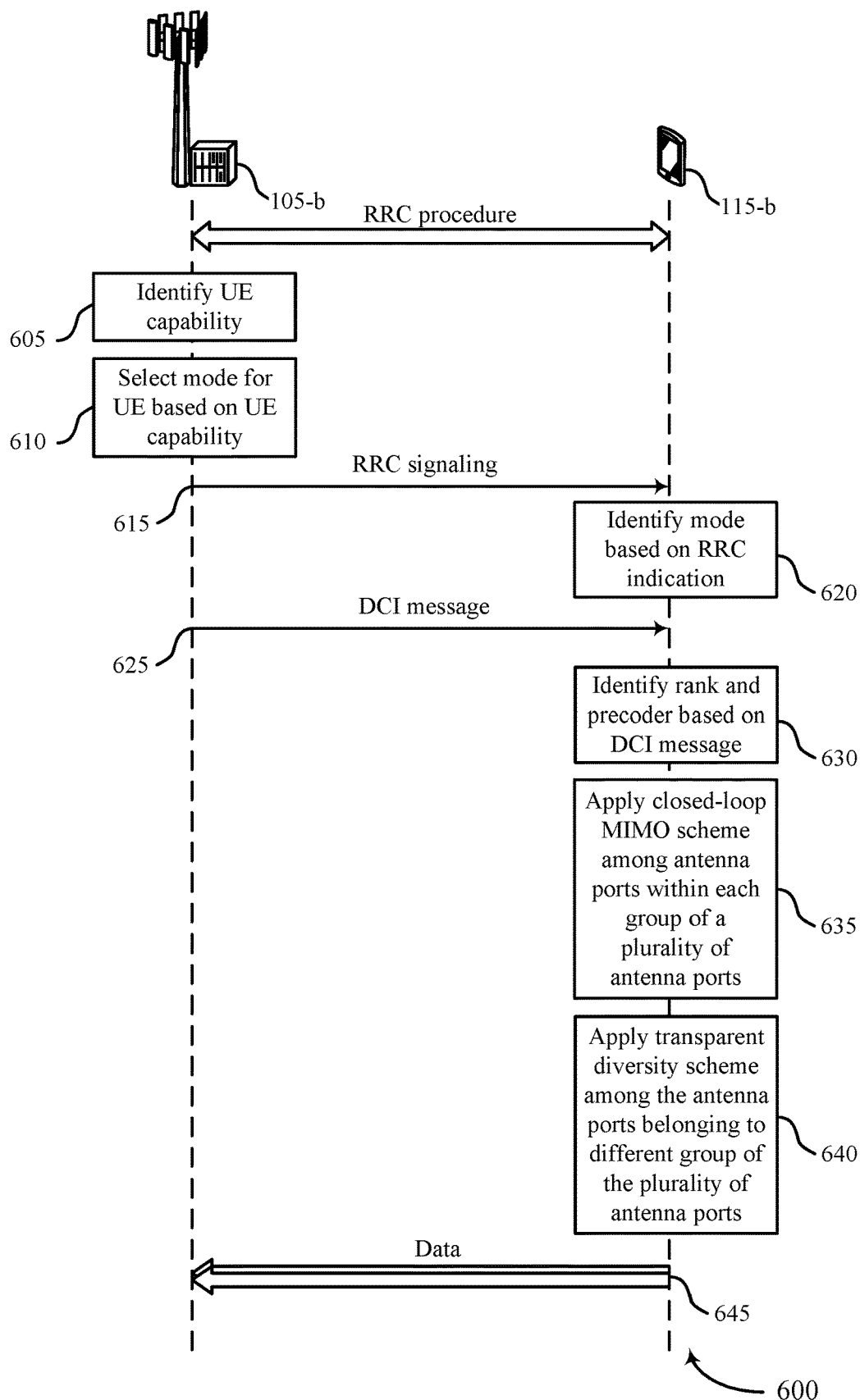
FIG. 6 illustrates an example of a process flow that supports hybrid closed-loop MIMO and transparent diversity scheme in NR in accordance with aspects of the present disclosure.

FIG. 6 illustrates an example of a process flow 600 that supports hybrid closed-loop MIMO and transparent diversity schemes in NR in accordance with various aspects of the present disclosure. In some examples, the process flow 600 may implement aspects of the wireless communications system 100 and 200. Base station 105-b and UE 115-b may be examples of the corresponding devices described with reference to FIGS. 1 and 2.

In the following description of the process flow 600, the operations between the base station 105-b and the UE 115-b may be transmitted in a different order than the exemplary order shown, or the operations performed by the base station 105-b and the UE 115-b may be performed in different orders or at different times. Some operations may also be left out of the process flow 600, or other operations may be added to the process flow 600.

In some examples, the process flow 600 may commence with the base station 105-b establishing a connection with the UE 115-b (e.g., performing a cell acquisition procedure, a random access procedure, an RRC connection procedure, an RRC configuration procedure).

At 605, the base station 105-a may identify UE capability associated with UE 115-b. the UE capability may include an indication of groups of antenna ports and information corresponding to coherence and non-coherence corresponding to different groups of antenna ports. In some examples, the UE capability may be reported to the base station 105-a during an RRC procedure. At 610, the base station 105-b may select a mode for the UE 115-a based on the UE capability. For example, the base station 105-b may select a mode that indicates for the UE 115-b to use both a closed-loop MIMO scheme and a transparent diversity scheme for UL transmissions. At 615, the base station 105-b may transmit RRC signaling (e.g., an RRC message) to the UE 115-b. At 620, the UE 115-b may identify the mode based on the RRC signaling. At 625, the base station 105-b may transmit a DCI message to the UE 115-b. In some examples, the DCI message may carry the indication to use both a closed-loop MIMO scheme and a transparent diversity scheme for UL transmissions. The DCI message at 620, or another DCI message, may indicate rank associated with the uplink data for which the closed MIMO scheme is to be applied at 635. Additionally or alternatively, the DCI message at 620, or another DCI message, may indicate one or more precoders to be applied at 635 for the closed-loop MIMO scheme.

At 630, the UE 115-b may identify the rank and precoder based on the DCI message. At 635, the UE 115-b may apply a closed-loop MIMO scheme among antenna ports within each group of a set of antenna ports. At 640, the UE 115-b may apply a transparent diversity scheme among the antenna ports belonging to different group of the set of antenna ports. At 645, the UE 115-b may simultaneously transmit data using the antenna ports within each group of the set of antenna ports.

In other examples, for example with reference to the features of block diagram 500, the 630 may occur before 625.

Figure 7:
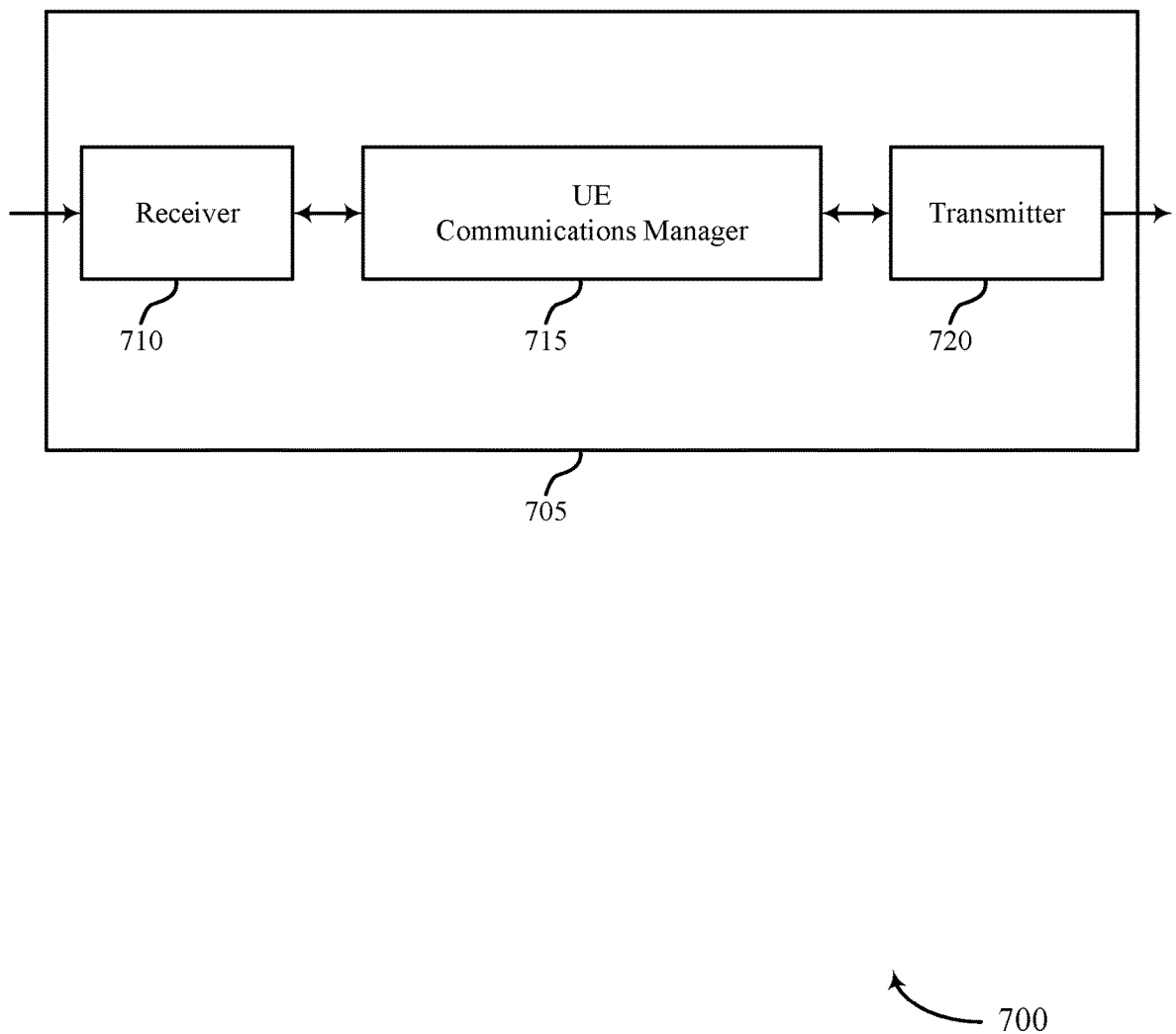
FIGS. 7 and 8 show block diagrams of devices that support hybrid closed-loop MIMO and transparent diversity scheme in NR in accordance with aspects of the present disclosure.

FIG. 7 shows a block diagram 700 of a device 705 that supports hybrid closed-loop MIMO and transparent diversity scheme in NR in accordance with aspects of the present disclosure. The device 705 may be an example of aspects of a UE 115 as described herein. The device 705 may include a receiver 710, a UE communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to hybrid closed-loop MIMO and transparent diversity scheme in NR, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may receive, from a base station, an indication that the UE is to use both a closed-loop MIMO scheme and a transparent diversity scheme for transmissions of uplink data using a set of antenna ports that include a set of groups of antenna ports, antenna ports within each group of antenna ports being phase coherent with each other antenna port belonging to the group of antenna ports and being phase incoherent with the antenna ports belonging to at least one other group of antenna ports, generate, from the uplink data, a set of output signals corresponding to the set of antenna ports based on applying the closed-loop MIMO scheme for the set of groups of antenna ports and the transparent diversity scheme among antenna ports belonging to different groups of antenna ports, and transmit the set of output signals using the set of antenna ports. The actions performed by the UE communications manager 715 as described herein may be implemented to realize one or more potential advantages. One implementation may allow a UE 115 to reduce signaling latency by fully utilizing its resources and decrease instances of wasted (e.g., unused) resources. Another implementation may provide improved quality and reliability of service at the UE 115, as latency and the number of separate resources allocated to the UE 115 may be reduced. The UE communications manager 715 may be an example of aspects of the UE communications manager 910 described herein.

The UE communications manager 715, or its sub-components, may be implemented in hardware, code (e.g., software or firmware) executed by a processor, or any combination thereof. If implemented in code executed by a processor, the functions of the UE communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 715, or its sub-components, may be physically located at various positions, including being distributed such that portions of functions are implemented at different physical locations by one or more physical components. In some examples, the UE communications manager 715, or its sub-components, may be a separate and distinct component in accordance with various aspects of the present disclosure. In some examples, the UE communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 920 described with reference to FIG. 9. The transmitter 720 may utilize a single antenna or a set of antennas.

Figure 8:
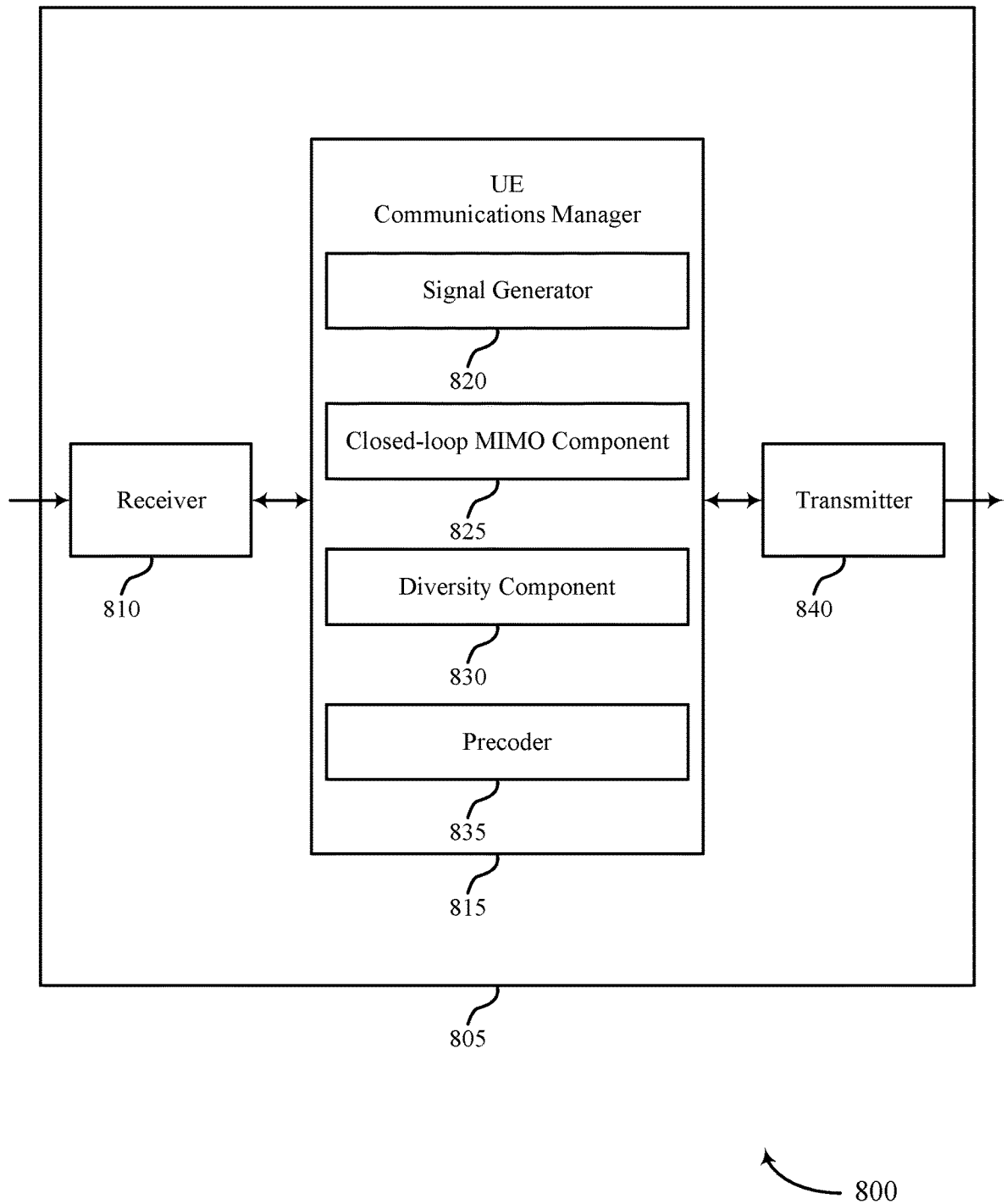

FIG. 8 shows a block diagram 800 of a device 805 that supports hybrid closed-loop MIMO and transparent diversity scheme in NR in accordance with aspects of the present disclosure. The device 805 may be an example of aspects of a device 705 or a UE 115 as described herein. The device 805 may include a receiver 810, a UE communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to hybrid closed-loop MIMO and transparent diversity scheme in NR, etc.). Information may be passed on to other components of the device 805. The receiver 810 may be an example of aspects of the transceiver 920 described with reference to FIG. 9. The receiver 810 may utilize a single antenna or a set of antennas.

The receiver 810 may receive, from a base station, an indication that the UE is to use both a closed-loop MIMO scheme and a transparent diversity scheme for transmissions of uplink data using a set of antenna ports that include a set of groups of antenna ports, antenna ports within each group of antenna ports being phase coherent with each other antenna port belonging to the group of antenna ports and being phase incoherent with the antenna ports belonging to at least one other group of antenna ports. In some examples, the receiver 810 may receive DCI indicating a rank associated with the uplink data to which the closed-loop MIMO scheme is to be applied. In some examples, the receiver 810 may receive DCI indicating at least one precoder to be applied in the closed-loop MIMO scheme.

The UE communications manager 815 may be an example of aspects of the UE communications manager 715 as described herein. Based applying both a closed-loop MIMO scheme and a transparent diversity scheme to one antenna pair that is coherent and another antenna pair that is noncoherent, a processor of a UE 115 (e.g., controlling the receiver 810, the transmitter 840, or the transceiver 920 as described with reference to FIG. 9) may be able fully utilize its resources. Further, the processor of UE 115 may receive an indication that indicates when the hybrid scheme should be applied. As such, when the hybrid scheme indication is received, the processor may apply the hybrid scheme to two or more antenna groups and be capable of using more or all of the allocated transmit power by using both antenna groups contemporaneously.

The UE communications manager 815 may include a signal generator 820, a closed-loop MIMO component 825, a diversity component 830, and a precoder 835. The UE communications manager 815 may be an example of aspects of the UE communications manager 910 described herein.

The signal generator 820 may generate, from the uplink data, a set of output signals corresponding to the set of antenna ports based on applying the closed-loop MIMO scheme for the set of groups of antenna ports and the transparent diversity scheme among antenna ports belonging to different groups of antenna ports.

The closed-loop MIMO component 825 may apply the closed-loop MIMO scheme to the uplink data among the antenna ports within each group of the set of groups of antenna ports. In some examples, the closed-loop MIMO component 825 may apply the closed-loop MIMO scheme to an output of the applied transparent diversity scheme. In some examples, the closed-loop MIMO component 825 may apply the closed-loop MIMO scheme to the set of virtual antenna port. In some examples, the closed-loop MIMO component 825 may apply the closed-loop MIMO scheme and the transparent diversity scheme applied to the uplink data to a DMRS associated with the uplink data. In this case, the receiver 810 may not need to know the specific parameters associated with the diversity scheme (e.g., the phase θ applied in the small delay CDD scheme, as described with reference to FIGS. 3 and 4) to decode the uplink data. That is, the diversity scheme applied at the UE may be "transparent" to the receiver 810 at the base station.

The diversity component 830 may apply, to an output of the applied closed-loop MIMO scheme, the transparent diversity scheme among the groups of antenna ports. In some examples, the diversity component 830 may apply, to the uplink data, the transparent diversity scheme among the antenna ports of the set of groups of antenna ports. In some examples, the diversity component 830 may apply the transparent diversity scheme among each antenna port of a first group of antenna ports and a corresponding antenna port of a second group of antenna ports to generate a set of virtual antenna ports. In some examples, the diversity component 830 may apply the transparent diversity scheme among (e.g., virtually combine) each antenna port of a first group of antenna ports and a corresponding antenna port of a second group of antenna ports to generate a set of virtual SRS ports.

The precoder 835 may pre-code, for a first group of the set of groups of antenna ports, the uplink data according to a first precoder. In some examples, the precoder 835 may pre-code, for a second group of the set of groups of antenna ports, the uplink data according to a second precoder different from the first precoder.

The transmitter 840 may transmit signals generated by other components of the device 805. In some examples, the transmitter 840 may be collocated with a receiver 810 in a transceiver module. For example, the transmitter 840 may be an example of aspects of the transceiver 920 described with reference to FIG. 9. The transmitter 840 may utilize a single antenna or a set of antennas.

The transmitter 840 may transmit the set of output signals using the set of antenna ports. In some examples, the transmitter 840 may transmit an SRS separately for each of the set of virtual antenna ports. In some examples, the transmitter 840 may transmit the DMRS using the set of antenna ports. In some examples, the transmitter 840 may transmit an SRS separately for each of the set of antenna ports. For example, the transmitter 840 may transmit SRS for each virtual antenna port if the transparent diversity is applied prior to closed-loop MIMO. The transmitter 840 may transmits SRS for reach antenna port if the transparent diversity scheme is applied after the closed-loop MIMO scheme.

Figure 9:
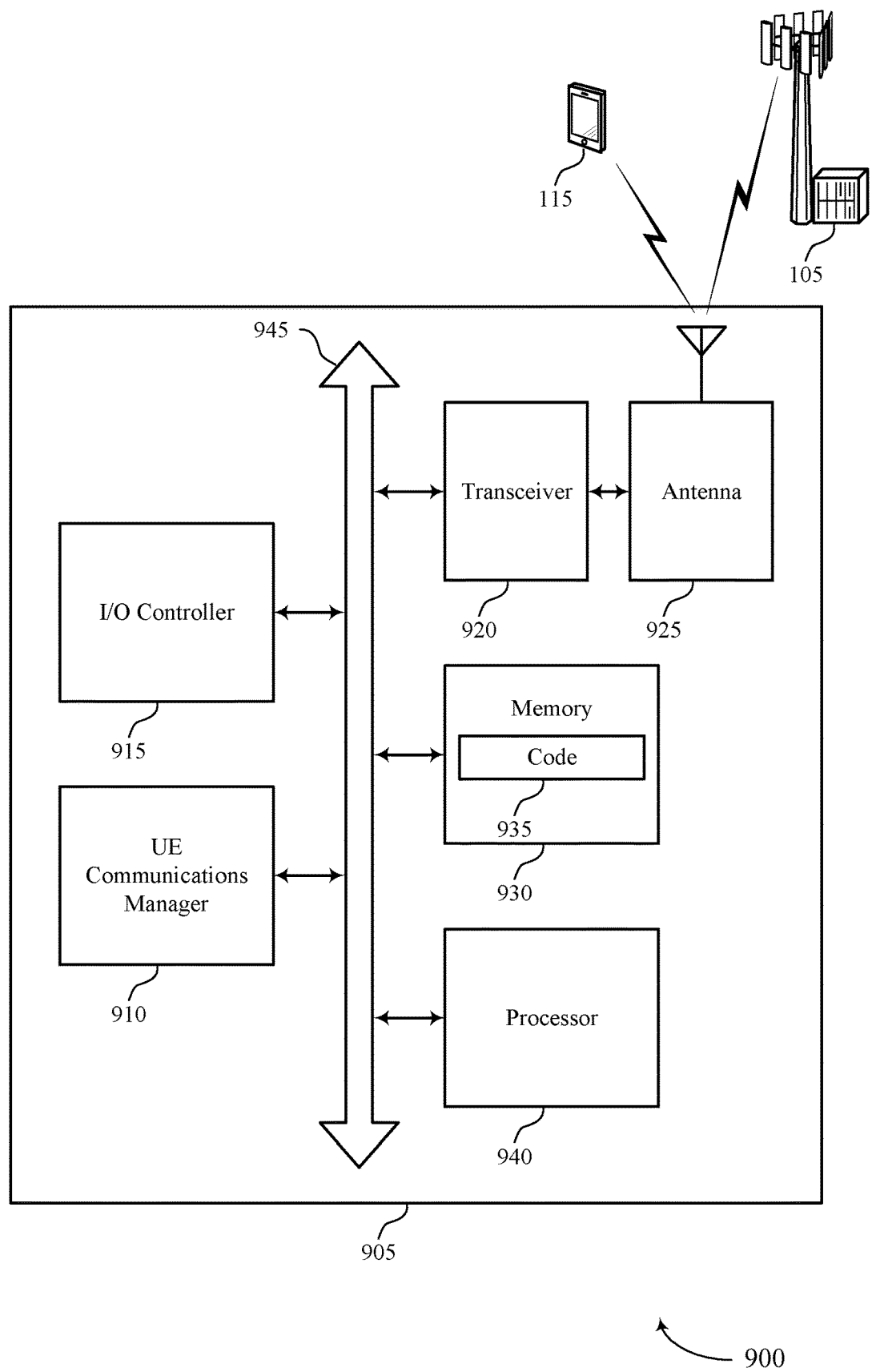
FIG. 9 shows a diagram of a system including a device that supports hybrid closed-loop MIMO and transparent diversity scheme in NR in accordance with aspects of the present disclosure.

FIG. 9 shows a diagram of a system 900 including a device 905 that supports hybrid closed-loop MIMO and transparent diversity scheme in NR in accordance with aspects of the present disclosure. The device 905 may be an example of or include the components of device 705, device 805, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may receive, from a base station, an indication that the UE is to use both a closed-loop MIMO scheme and a transparent diversity scheme for transmissions of uplink data using a set of antenna ports that include a set of groups of antenna ports, antenna ports within each group of antenna ports being phase coherent with each other antenna port belonging to the group of antenna ports and being phase incoherent with the antenna ports belonging to at least one other group of antenna ports, generate, from the uplink data, a set of output signals corresponding to the set of antenna ports based on applying the closed-loop MIMO scheme for the set of groups of antenna ports and the transparent diversity scheme among antenna ports belonging to different groups of antenna ports, and transmit the set of output signals using the set of antenna ports.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting hybrid closed-loop MIMO and transparent diversity scheme in NR).

The code 935 may include instructions to implement aspects of the present disclosure, including instructions to support hybrid closed-loop MIMO schemes and transparent diversity schemes. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
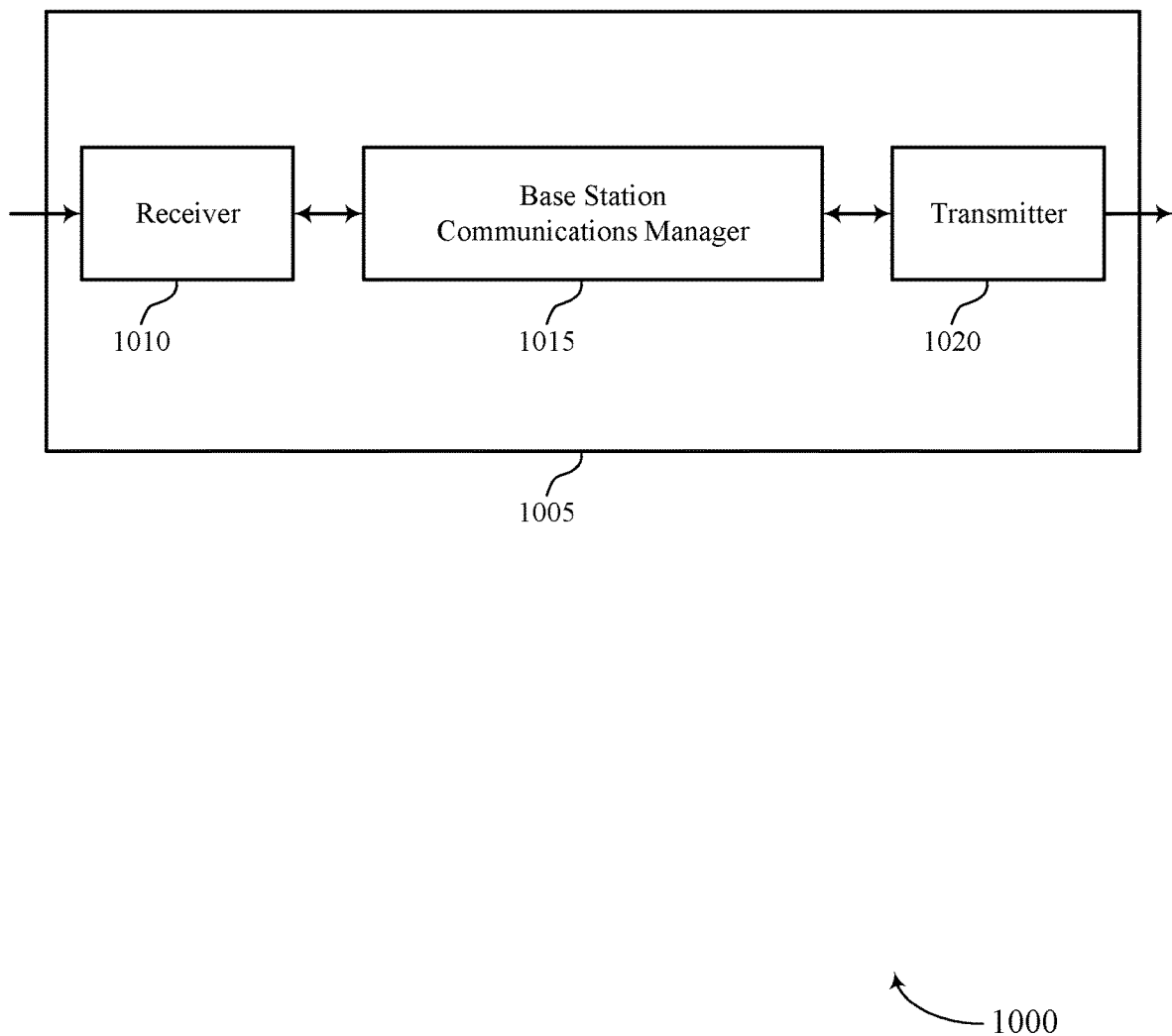
FIGS. 10 and 11 show block diagrams of devices that support hybrid closed-loop MIMO and transparent diversity scheme in NR in accordance with aspects of the present disclosure.

FIG. 10 shows a block diagram 1000 of a device 1005 that supports hybrid closed-loop MIMO and transparent diversity scheme in NR in accordance with aspects of the present disclosure. The device 1005 may be an example of aspects of a base station 105 as described herein. The device 1005 may include a receiver 1010, a base station communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to hybrid closed-loop MIMO and transparent diversity scheme in NR, etc.). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may identify that a UE is to use both a closed-loop MIMO scheme and a transparent diversity scheme to transmit uplink data using a set of antenna ports that include a set of groups of antenna ports, antenna ports within each group of antenna ports being phase coherent with each other antenna port belonging to the group of antenna ports and being phase incoherent with the antenna ports belonging to at least one other group of antenna ports and transmit, to the UE, an indication that the UE is to use the closed-loop MIMO scheme for the set of groups of antenna ports and the transparent diversity scheme among antenna ports belonging to different groups of antenna ports. The base station communications manager 1015 may be an example of aspects of the base station communications manager 1210 described herein.

The base station communications manager 1015, or its sub-components, may be implemented in hardware, code (e.g., software or firmware) executed by a processor, or any combination thereof. If implemented in code executed by a processor, the functions of the base station communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1015, or its sub-components, may be physically located at various positions, including being distributed such that portions of functions are implemented at different physical locations by one or more physical components. In some examples, the base station communications manager 1015, or its sub-components, may be a separate and distinct component in accordance with various aspects of the present disclosure. In some examples, the base station communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1220 described with reference to FIG. 12. The transmitter 1020 may utilize a single antenna or a set of antennas.

Figure 11:
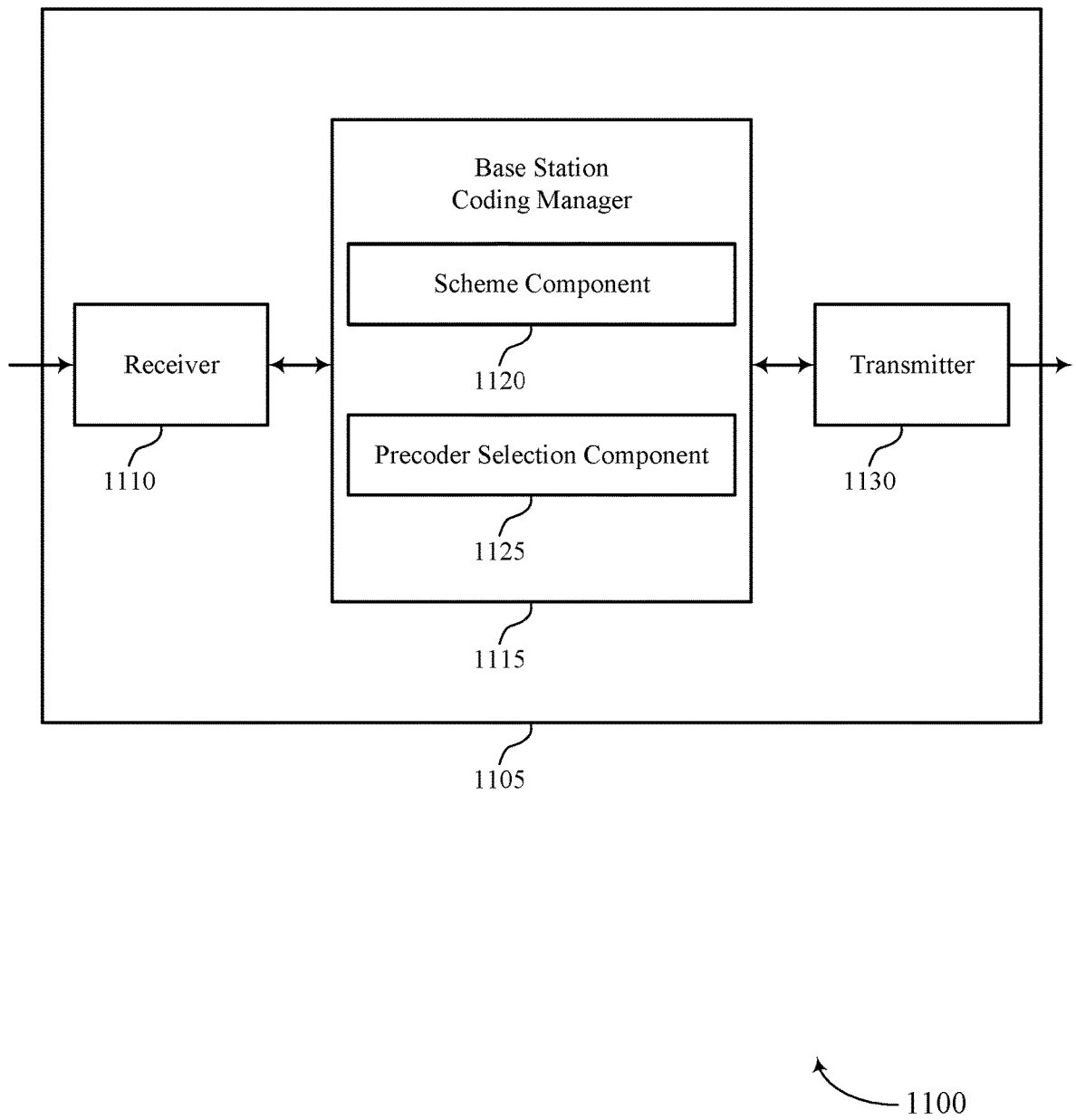

FIG. 11 shows a block diagram 1100 of a device 1105 that supports hybrid closed-loop MIMO and transparent diversity scheme in NR in accordance with aspects of the present disclosure. The device 1105 may be an example of aspects of a device 1005 or a base station 105 as described herein. The device 1105 may include a receiver 1110, a base station communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to hybrid closed-loop MIMO and transparent diversity scheme in NR, etc.). Information may be passed on to other components of the device 1105. The receiver 1110 may be an example of aspects of the transceiver 1220 described with reference to FIG. 12. The receiver 1110 may utilize a single antenna or a set of antennas.

The base station communications manager 1115 may be an example of aspects of the base station communications manager 1015 as described herein. The base station communications manager 1115 may include a scheme component 1120 and a precoder selection component 1125. The base station communications manager 1115 may be an example of aspects of the base station communications manager 1210 described herein.

The scheme component 1120 may identify that a UE is to use both a closed-loop MIMO scheme and a transparent diversity scheme to transmit uplink data using a set of antenna ports that include a set of groups of antenna ports, antenna ports within each group of antenna ports being phase coherent with each other antenna port belonging to the group of antenna ports and being phase incoherent with the antenna ports belonging to at least one other group of antenna ports. The precoder selection component 1125 may select a precoder for the UE to apply in the closed-loop MIMO scheme.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1220 described with reference to FIG. 12. The transmitter 1130 may utilize a single antenna or a set of antennas. The transmitter 1130 may transmit, to the UE, an indication that the UE is to use the closed-loop MIMO scheme for the set of groups of antenna ports and the transparent diversity scheme among antenna ports belonging to different groups of antenna ports.

The transmitter 1130 may transmit, to the UE, an indication that the UE is to use the closed-loop MIMO scheme for the set of groups of antenna ports and the transparent diversity scheme among antenna ports belonging to different groups of antenna ports. In some examples, the transmitter 1130 may transmit an indication that the uplink data is to be precoded for a first group of the set of groups of antenna ports according to a first precoder, and the uplink data is to be precoded for a second group of the set of groups antenna ports according to a second precoder different from the first precoder.

In some examples, the transmitter 1130 may transmit radio resource control signaling that includes the indication that the UE is to use the closed-loop MIMO scheme and the transparent diversity scheme. In some examples, the transmitter 1130 may transmit DCI indicating a rank associated with the uplink data to which the closed-loop MIMO scheme is to be applied. In some examples, the transmitter 1130 may transmit DCI indicating at least one precoder for the UE to apply in the closed-loop MIMO scheme. In some examples, the transmitter 1130 may transmit an indication of the selected precoder to the UE.

Figure 12:
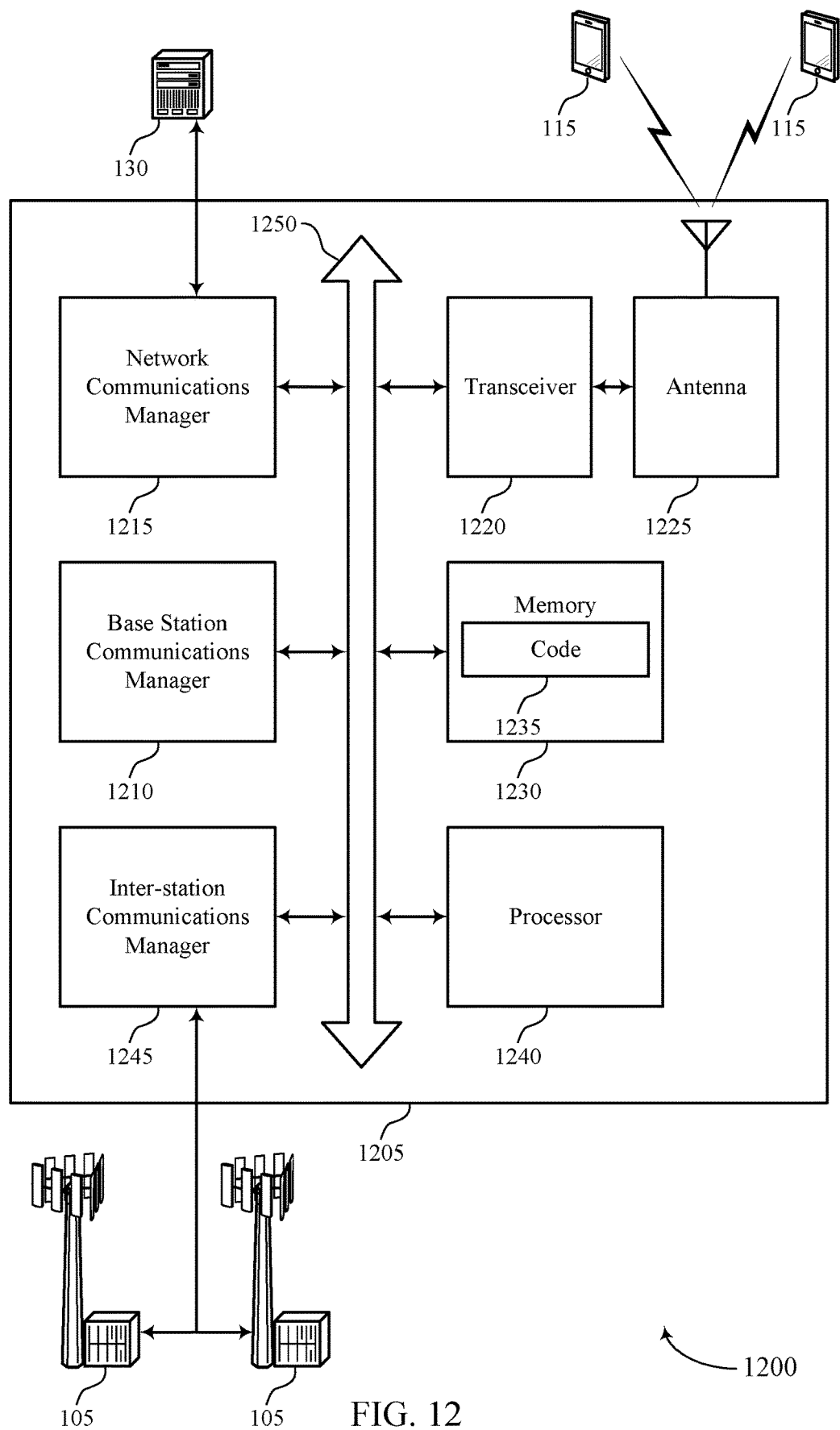
FIG. 12 shows a diagram of a system including a device that supports hybrid closed-loop MIMO and transparent diversity scheme in NR in accordance with aspects of the present disclosure.

FIG. 12 shows a diagram of a system 1200 including a device 1205 that supports hybrid closed-loop MIMO and transparent diversity scheme in NR in accordance with aspects of the present disclosure. The device 1205 may be an example of or include the components of device 1005, device 1105, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may identify that a UE is to use both a closed-loop MIMO scheme and a transparent diversity scheme to transmit uplink data using a set of antenna ports that include a set of groups of antenna ports, antenna ports within each group of antenna ports being phase coherent with each other antenna port belonging to the group of antenna ports and being phase incoherent with the antenna ports belonging to at least one other group of antenna ports and transmit, to the UE, an indication that the UE is to use the closed-loop MIMO scheme for the set of groups of antenna ports and the transparent diversity scheme among antenna ports belonging to different groups of antenna ports.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting hybrid closed-loop MIMO and transparent diversity scheme in NR).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support hybrid closed-loop MIMO and transparent diversity scheme in NR. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
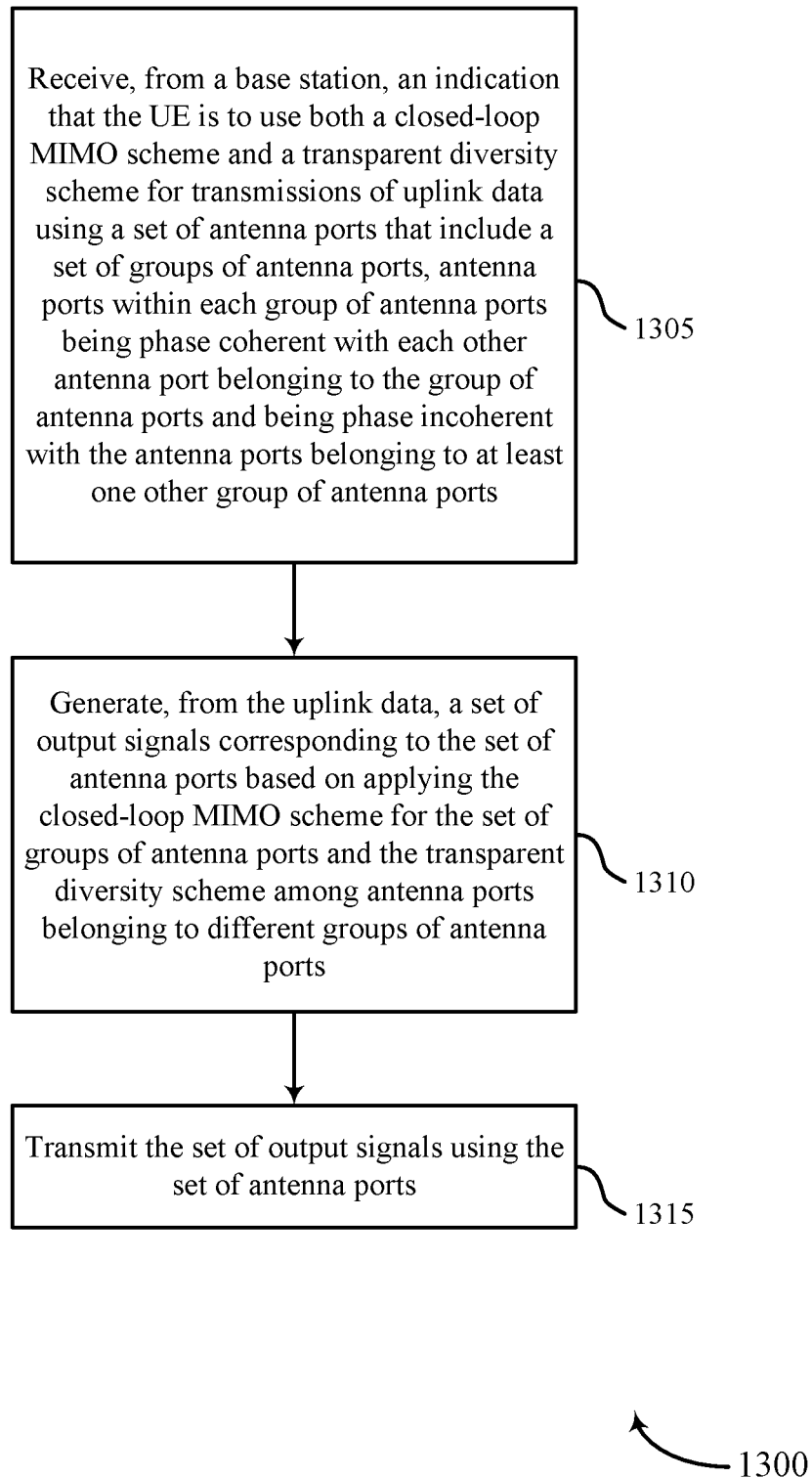
FIGS. 13 through 17 show flowcharts illustrating methods that support hybrid closed-loop MIMO and transparent diversity scheme in NR in accordance with aspects of the present disclosure.

FIG. 13 shows a flowchart illustrating a method 1300 that supports hybrid closed-loop MIMO and transparent diversity scheme in NR in accordance with aspects of the present disclosure. The operations of method 1300 may be implemented by a UE 115 or its components as described herein. For example, the operations of method 1300 may be performed by a UE communications manager as described with reference to FIGS. 7 through 9. In some examples, a UE may execute a set of instructions to control the functional elements of the UE to perform the functions described herein. Additionally or alternatively, a UE may perform aspects of the functions described herein using special-purpose hardware.

At 1305, the UE may receive, from a base station, an indication that the UE is to use both a closed-loop MIMO scheme and a transparent diversity scheme for transmissions of uplink data using a set of antenna ports that include a set of groups of antenna ports, antenna ports within each group of antenna ports being phase coherent with each other antenna port belonging to the group of antenna ports and being phase incoherent with the antenna ports belonging to at least one other group of antenna ports. The operations of 1305 may be performed according to the methods described herein. In some examples, aspects of the operations of 1305 may be performed by a receiver as described with reference to FIGS. 7 through 9.

At 1310, the UE may generate, from the uplink data, a set of output signals corresponding to the set of antenna ports based on applying the closed-loop MIMO scheme for the set of groups of antenna ports and the transparent diversity scheme among antenna ports belonging to different groups of antenna ports. The operations of 1310 may be performed according to the methods described herein. In some examples, aspects of the operations of 1310 may be performed by a signal generator as described with reference to FIGS. 7 through 9.

At 1315, the UE may transmit the set of output signals using the set of antenna ports. The operations of 1315 may be performed according to the methods described herein. In some examples, aspects of the operations of 1315 may be performed by a transmitter as described with reference to FIGS. 7 through 9.

Figure 14:
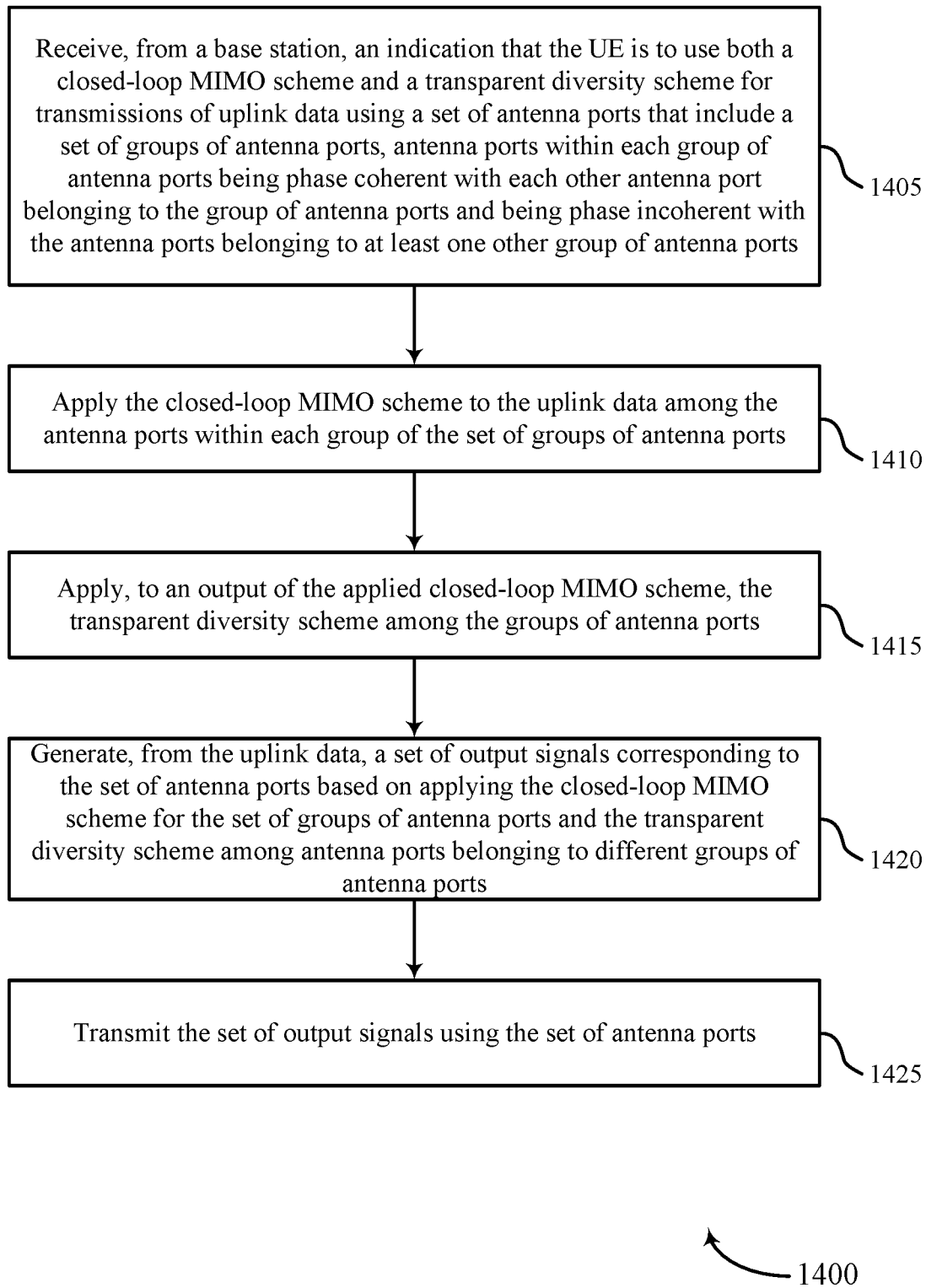

FIG. 14 shows a flowchart illustrating a method 1400 that supports hybrid closed-loop MIMO and transparent diversity scheme in NR in accordance with aspects of the present disclosure. The operations of method 1400 may be implemented by a UE 115 or its components as described herein. For example, the operations of method 1400 may be performed by a UE communications manager as described with reference to FIGS. 7 through 9. In some examples, a UE may execute a set of instructions to control the functional elements of the UE to perform the functions described herein. Additionally or alternatively, a UE may perform aspects of the functions described herein using special-purpose hardware.

At 1405, the UE may receive, from a base station, an indication that the UE is to use both a closed-loop MIMO scheme and a transparent diversity scheme for transmissions of uplink data using a set of antenna ports that include a set of groups of antenna ports, antenna ports within each group of antenna ports being phase coherent with each other antenna port belonging to the group of antenna ports and being phase incoherent with the antenna ports belonging to at least one other group of antenna ports. The operations of 1405 may be performed according to the methods described herein. In some examples, aspects of the operations of 1405 may be performed by a receiver as described with reference to FIGS. 7 through 9.

At 1410, the UE may apply the closed-loop MIMO scheme to the uplink data among the antenna ports within each group of the set of groups of antenna ports. The operations of 1410 may be performed according to the methods described herein. In some examples, aspects of the operations of 1410 may be performed by a closed-loop MIMO component as described with reference to FIGS. 7 through 9.

At 1415, the UE may apply, to an output of the applied closed-loop MIMO scheme, the transparent diversity scheme among the groups of antenna ports. The operations of 1415 may be performed according to the methods described herein. In some examples, aspects of the operations of 1415 may be performed by a diversity component as described with reference to FIGS. 7 through 9.

At 1420, the UE may generate, from the uplink data, a set of output signals corresponding to the set of antenna ports based on applying the closed-loop MIMO scheme for the set of groups of antenna ports and the transparent diversity scheme among antenna ports belonging to different groups of antenna ports. The operations of 1420 may be performed according to the methods described herein. In some examples, aspects of the operations of 1420 may be performed by a signal generator as described with reference to FIGS. 7 through 9.

At 1425, the UE may transmit the set of output signals using the set of antenna ports. The operations of 1425 may be performed according to the methods described herein. In some examples, aspects of the operations of 1425 may be performed by a transmitter as described with reference to FIGS. 7 through 9.

Figure 15:
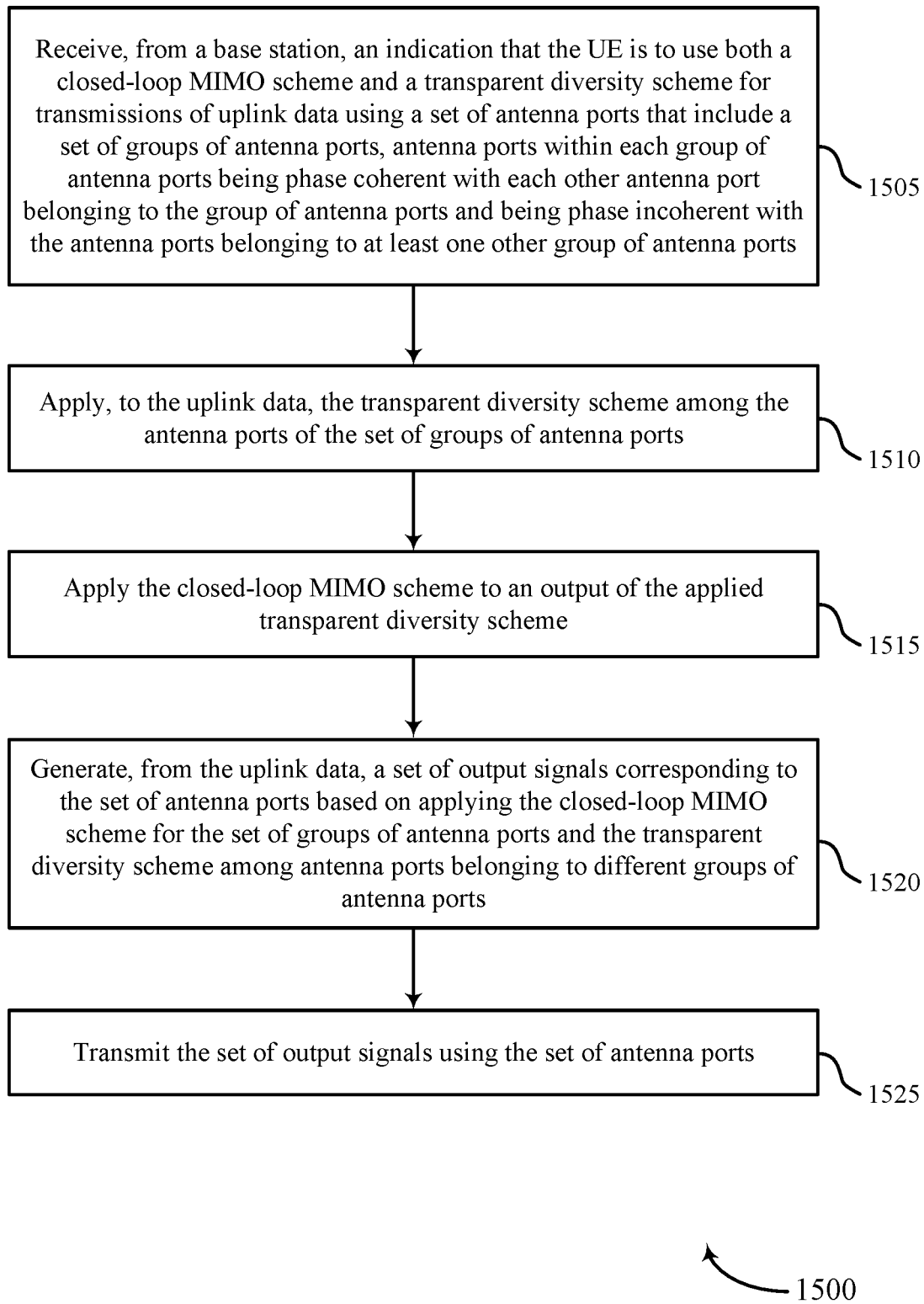

FIG. 15 shows a flowchart illustrating a method 1500 that supports hybrid closed-loop MIMO and transparent diversity scheme in NR in accordance with aspects of the present disclosure. The operations of method 1500 may be implemented by a UE 115 or its components as described herein. For example, the operations of method 1500 may be performed by a UE communications manager as described with reference to FIGS. 7 through 9. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a base station, an indication that the UE is to use both a closed-loop MIMO scheme and a transparent diversity scheme for transmissions of uplink data using a set of antenna ports that include a set of groups of antenna ports, antenna ports within each group of antenna ports being phase coherent with each other antenna port belonging to the group of antenna ports and being phase incoherent with the antenna ports belonging to at least one other group of antenna ports. The operations of 1505 may be performed according to the methods described herein. In some examples, aspects of the operations of 1505 may be performed by a receiver as described with reference to FIGS. 7 through 9.

At 1510, the UE may apply, to the uplink data, the transparent diversity scheme among the antenna ports of the set of groups of antenna ports. The operations of 1510 may be performed according to the methods described herein. In some examples, aspects of the operations of 1510 may be performed by a diversity component as described with reference to FIGS. 7 through 9.

At 1515, the UE may apply the closed-loop MIMO scheme to an output of the applied transparent diversity scheme. The operations of 1515 may be performed according to the methods described herein. In some examples, aspects of the operations of 1515 may be performed by a closed-loop MIMO component as described with reference to FIGS. 7 through 9.

At 1520, the UE may generate, from the uplink data, a set of output signals corresponding to the set of antenna ports based on applying the closed-loop MIMO scheme for the set of groups of antenna ports and the transparent diversity scheme among antenna ports belonging to different groups of antenna ports. The operations of 1520 may be performed according to the methods described herein. In some examples, aspects of the operations of 1520 may be performed by a signal generator as described with reference to FIGS. 7 through 9.

At 1525, the UE may transmit the set of output signals using the set of antenna ports. The operations of 1525 may be performed according to the methods described herein. In some examples, aspects of the operations of 1525 may be performed by a transmitter as described with reference to FIGS. 7 through 9.

Figure 16:
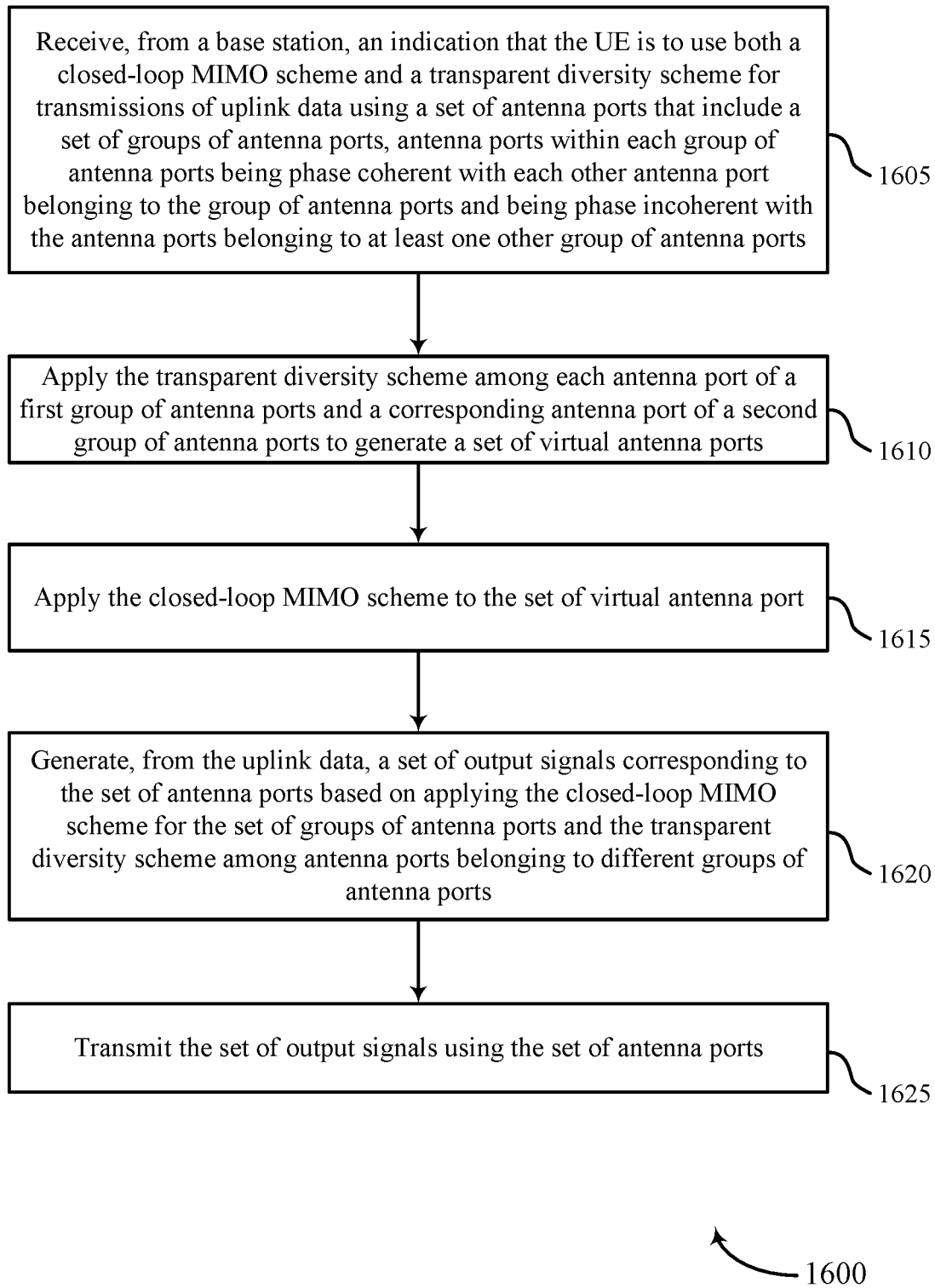

FIG. 16 shows a flowchart illustrating a method 1600 that supports hybrid closed-loop MIMO and transparent diversity scheme in NR in accordance with aspects of the present disclosure. The operations of method 1600 may be implemented by a UE 115 or its components as described herein. For example, the operations of method 1600 may be performed by a UE communications manager as described with reference to FIGS. 7 through 9. In some examples, a UE may execute a set of instructions to control the functional elements of the UE to perform the functions described herein. Additionally or alternatively, a UE may perform aspects of the functions described herein using special-purpose hardware.

At 1605, the UE may receive, from a base station, an indication that the UE is to use both a closed-loop MIMO scheme and a transparent diversity scheme for transmissions of uplink data using a set of antenna ports that include a set of groups of antenna ports, antenna ports within each group of antenna ports being phase coherent with each other antenna port belonging to the group of antenna ports and being phase incoherent with the antenna ports belonging to at least one other group of antenna ports. The operations of 1605 may be performed according to the methods described herein. In some examples, aspects of the operations of 1605 may be performed by a receiver as described with reference to FIGS. 7 through 9.

At 1610, the UE may apply the transparent diversity scheme among (e.g., virtually combine) each antenna port of a first group of antenna ports and a corresponding antenna port of a second group of antenna ports to generate a set of virtual antenna ports. The operations of 1610 may be performed according to the methods described herein. In some examples, aspects of the operations of 1610 may be performed by a diversity component as described with reference to FIGS. 7 through 9.

At 1615, the UE may apply the closed-loop MIMO scheme to the set of virtual antenna port. The operations of 1615 may be performed according to the methods described herein. In some examples, aspects of the operations of 1615 may be performed by a closed-loop MIMO component as described with reference to FIGS. 7 through 9.

At 1620, the UE may generate, from the uplink data, a set of output signals corresponding to the set of antenna ports based on applying the closed-loop MIMO scheme for the set of groups of antenna ports and the transparent diversity scheme among antenna ports belonging to different groups of antenna ports. The operations of 1620 may be performed according to the methods described herein. In some examples, aspects of the operations of 1620 may be performed by a signal generator as described with reference to FIGS. 7 through 9.

At 1625, the UE may transmit the set of output signals using the set of antenna ports. The operations of 1625 may be performed according to the methods described herein. In some examples, aspects of the operations of 1625 may be performed by a transmitter as described with reference to FIGS. 7 through 9.

Figure 17:
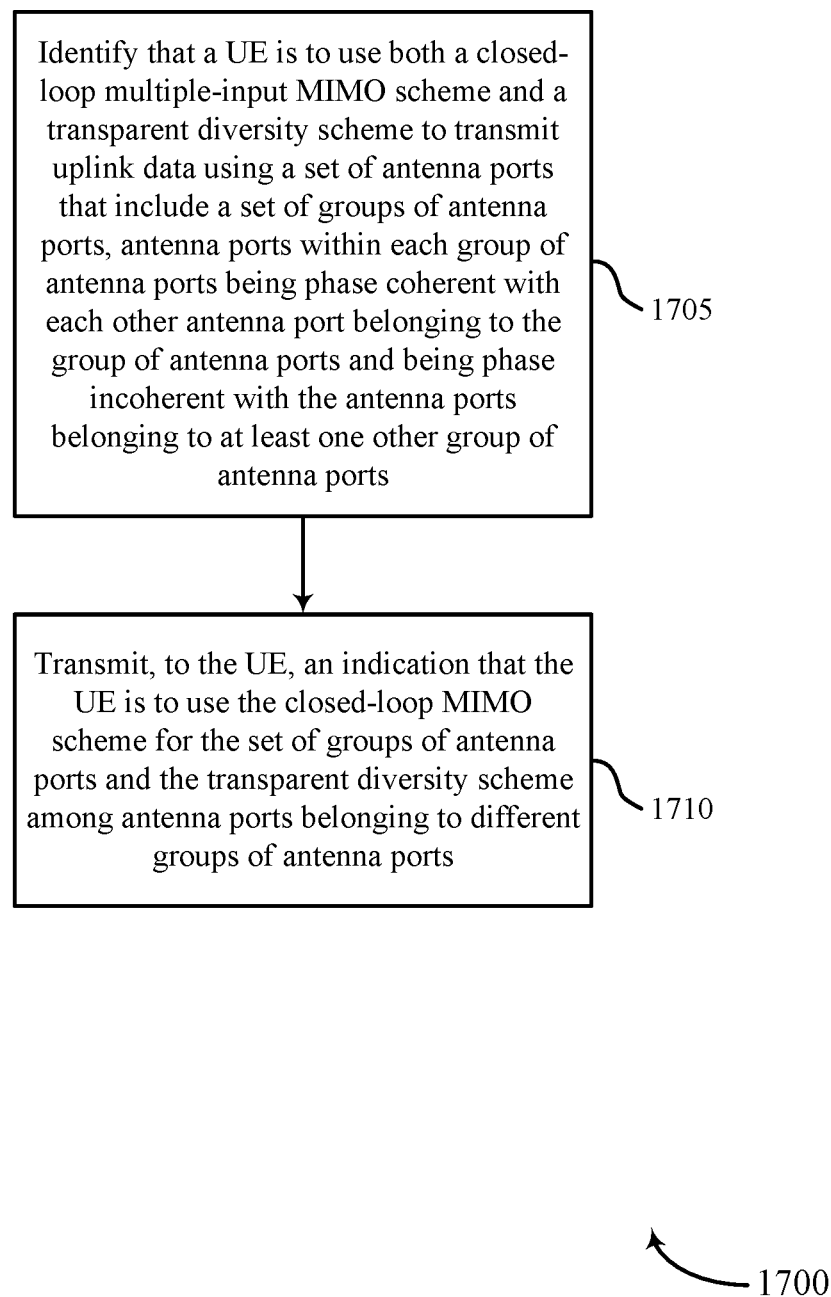

FIG. 17 shows a flowchart illustrating a method 1700 that supports hybrid closed-loop MIMO and transparent diversity scheme in NR in accordance with aspects of the present disclosure. The operations of method 1700 may be implemented by a base station 105 or its components as described herein. For example, the operations of method 1700 may be performed by a base station communications manager as described with reference to FIGS. 10 through 12. In some examples, a base station may execute a set of instructions to control the functional elements of the base station to perform the functions described herein. Additionally or alternatively, a base station may perform aspects of the functions described herein using special-purpose hardware.

At 1705, the base station may identify that a UE is to use both a closed-loop MIMO scheme and a transparent diversity scheme to transmit uplink data using a set of antenna ports that include a set of groups of antenna ports, antenna ports within each group of antenna ports being phase coherent with each other antenna port belonging to the group of antenna ports and being phase incoherent with the antenna ports belonging to at least one other group of antenna ports. The operations of 1705 may be performed according to the methods described herein. In some examples, aspects of the operations of 1705 may be performed by a scheme component as described with reference to FIGS. 10 through 12.

At 1710, the base station may transmit, to the UE, an indication that the UE is to use the closed-loop MIMO scheme for the set of groups of antenna ports and the transparent diversity scheme among antenna ports belonging to different groups of antenna ports. The operations of 1710 may be performed according to the methods described herein. In some examples, aspects of the operations of 1710 may be performed by a transmitter as described with reference to FIGS. 10 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
   a processor;
   memory coupled with the processor; and
   instructions stored in the memory and executable by the processor to cause the apparatus to:
      receive, from a base station, an indication that the UE is to use a closed-loop multiple-input multiple-output (MIMO) scheme for transmissions of uplink data via a plurality of antenna ports, wherein the plurality of antenna ports include a plurality of groups of antenna ports, wherein antenna ports within a group of antenna ports are phase coherent with each other antenna port belonging to the group of antenna ports, and wherein the antenna ports within the group of antenna ports are phase incoherent with antenna ports that belong to at least one other group of antenna ports;
      generate, from the uplink data, a plurality of output signals that correspond to the plurality of antenna ports based at least in part on application of the closed-loop MIMO scheme for the plurality of groups of antenna ports; and
      transmit the plurality of output signals via the plurality of antenna ports.

2. The apparatus of claim 1, wherein the instructions are further executable by the processor to cause the apparatus to:
   transmit, to the base station, a UE capability message that indicates coherence information associated with the plurality of groups of antenna ports, wherein the coherence information indicates that the antenna ports within the group of antenna ports are phase coherent with each other antenna port belonging to the group of antenna ports, and wherein the antenna ports within the group of antenna ports are phase incoherent with antenna ports belonging to the at least one other group of antenna ports.

3. The apparatus of claim 1, wherein the indication includes downlink control information (DCI) indicating at least one precoder to be applied in the closed-loop MIMO scheme.

4. The apparatus of claim 1, wherein the instructions are further executable by the processor to cause the apparatus to:
   receive, via the indication, one or more transmission parameters associated with the closed-loop MIMO scheme, wherein the one or more transmission parameters comprise at least a rank indicator, or a precoding matrix indicator, or both, wherein the transmission of the plurality of output signals is based at least in part on the one or more transmission parameters.

5. The apparatus of claim 4, wherein the instructions are further executable by the processor to cause the apparatus to:
   select a precoder to be applied in the closed-loop MIMO scheme based at least in part on the rank indicator received via the indication.

6. The apparatus of claim 1, wherein the instructions are further executable by the processor to receive the indication by being executable by the processor to:
   receive radio resource control signaling that includes the indication that the UE is to use the closed-loop MIMO scheme; or
   receive downlink control information (DCI) that comprises the indication.

7. The apparatus of claim 1, wherein the indication further indicates that the UE is to use both the closed-loop MIMO scheme and a transparent diversity scheme for the transmission of the uplink data via the plurality of antenna ports.

8. The apparatus of claim 7, wherein the instructions are further executable by the processor to generate the plurality of output signals by being executable by the processor to:
   generate the plurality of output signals based at least in part on application of the closed-loop MIMO scheme for the plurality of groups of antenna ports and the transparent diversity scheme among antenna ports that belong to different groups of antenna ports.

9. The apparatus of claim 7, wherein the transparent diversity scheme comprises cyclic delay diversity, frequency switch transmit diversity, space-frequency block coding, space-time block coding, or a combination thereof.

10. A method for wireless communication at a user equipment (UE), comprising:
    receiving, from a base station, an indication that the UE is to use a closed-loop multiple-input multiple-output (MIMO) scheme for transmissions of uplink data using a plurality of antenna ports, wherein the plurality of antenna ports include a plurality of groups of antenna ports, wherein antenna ports within a group of antenna ports are phase coherent with each other antenna port belonging to the group of antenna ports, and wherein the antenna ports within the group of antenna ports are phase incoherent with antenna ports belonging to at least one other group of antenna ports;
    generating, from the uplink data, a plurality of output signals corresponding to the plurality of antenna ports based at least in part on applying the closed-loop MIMO scheme for the plurality of groups of antenna ports; and
    transmitting the plurality of output signals using the plurality of antenna ports.

11. The method of claim 10, further comprising:
    transmitting, to the base station, a UE capability message that indicates coherence information associated with the plurality of groups of antenna ports, wherein the coherence information indicates that the antenna ports within the group of antenna ports are phase coherent with each other antenna port belonging to the group of antenna ports, and wherein the antenna ports within the group of antenna ports are phase incoherent with antenna ports belonging to the at least one other group of antenna ports.

12. The method of claim 10, wherein the indication includes downlink control information (DCI) indicating at least one precoder to be applied in the closed-loop MIMO scheme.

13. The method of claim 10, further comprising:
    receiving, via the indication, one or more transmission parameters associated with the closed-loop MIMO scheme, the one or more transmission parameters comprising at least a rank indicator, a precoding matrix indicator, or both, wherein transmitting the plurality of output signals is based at least in part on the one or more transmission parameters.

14. The method of claim 13, further comprising:
selecting a precoder to be applied in the closed-loop MIMO scheme based at least in part on the rank indicator received via the indication.

15. The method of claim 10, wherein receiving the indication comprises:
receiving radio resource control signaling that includes the indication that the UE is to use the closed-loop MIMO scheme; or
receiving downlink control information (DCI) comprising the indication.

16. The method of claim 10, wherein the indication further indicates that the UE is to use both the closed-loop MIMO scheme and a transparent diversity scheme for the transmission of the uplink data using the plurality of antenna ports.

17. The method of claim 16, wherein generating the plurality of output signals comprises:
generating the plurality of output signals based at least in part on applying the closed-loop MIMO scheme for the plurality of groups of antenna ports and the transparent diversity scheme among antenna ports belonging to different groups of antenna ports.

18. The method of claim 16, wherein the transparent diversity scheme comprises cyclic delay diversity, frequency switch transmit diversity, space-frequency block coding, space-time block coding, or a combination thereof.

19. A non-transitory computer-readable medium storing code for wireless communication at a user equipment (UE), the code comprising instructions executable by a processor to:
receive, from a base station, an indication that the UE is to use a closed-loop multiple-input multiple-output (MIMO) scheme for transmissions of uplink data using a plurality of antenna ports, wherein the plurality of antenna ports include a plurality of groups of antenna ports, wherein antenna ports within a group of antenna ports are phase coherent with each other antenna port belonging to the group of antenna ports, and wherein the antenna ports within the group of antenna ports are phase incoherent with antenna ports belonging to at least one other group of antenna ports;
generate, from the uplink data, a plurality of output signals corresponding to the plurality of antenna ports based at least in part on applying the closed-loop MIMO scheme for the plurality of groups of antenna ports; and
transmit the plurality of output signals using the plurality of antenna ports.

20. The non-transitory computer-readable medium of claim 19, wherein the instructions are further executable by the processor to:
transmit, to the base station, a UE capability message that indicates coherence information associated with the plurality of groups of antenna ports, wherein the coherence information indicates that the antenna ports within the group of antenna ports are phase coherent with each other antenna port belonging to the group of antenna ports, and wherein the antenna ports within the group of antenna ports are phase incoherent with antenna ports belonging to the at least one other group of antenna ports.

21. The non-transitory computer-readable medium of claim 19, wherein the indication includes downlink control information (DCI) indicating at least one precoder to be applied in the closed-loop MIMO scheme.

22. The non-transitory computer-readable medium of claim 19, wherein the instructions are further executable by the processor to:
receive, via the indication, one or more transmission parameters associated with the closed-loop MIMO scheme, the one or more transmission parameters comprising at least a rank indicator, a precoding matrix indicator, or both, wherein transmitting the plurality of output signals is based at least in part on the one or more transmission parameters.

23. The non-transitory computer-readable medium of claim 22, wherein the instructions are further executable by the processor to:
select a precoder to be applied in the closed-loop MIMO scheme based at least in part on the rank indicator received via the indication.

24. The non-transitory computer-readable medium of claim 19, wherein the instructions to receive the indication are executable by the processor to:
receive radio resource control signaling that includes the indication that the UE is to use the closed-loop MIMO scheme; or
receive downlink control information (DCI) comprising the indication.

25. The non-transitory computer-readable medium of claim 19, wherein the indication further indicates that the UE is to use both the closed-loop MIMO scheme and a transparent diversity scheme for the transmission of the uplink data using the plurality of antenna ports.

26. The non-transitory computer-readable medium of claim 25, wherein generating the plurality of output signals comprises:
generating the plurality of output signals based at least in part on applying the closed-loop MIMO scheme for the plurality of groups of antenna ports and the transparent diversity scheme among antenna ports belonging to different groups of antenna ports.

27. The non-transitory computer-readable medium of claim 25, wherein the transparent diversity scheme comprises cyclic delay diversity, frequency switch transmit diversity, space-frequency block coding, space-time block coding, or a combination thereof.

28. An apparatus for wireless communication at a user equipment (UE), comprising:
means for receiving, from a base station, an indication that the UE is to use a closed-loop multiple-input multiple-output (MIMO) scheme for transmissions of uplink data using a plurality of antenna ports, wherein the plurality of antenna ports include a plurality of groups of antenna ports, wherein antenna ports within a group of antenna ports are phase coherent with each other antenna port belonging to the group of antenna ports, and wherein the antenna ports within the group of antenna ports are phase incoherent with antenna ports belonging to at least one other group of antenna ports;
means for generating, from the uplink data, a plurality of output signals corresponding to the plurality of antenna ports based at least in part on applying the closed-loop MIMO scheme for the plurality of groups of antenna ports; and
means for transmitting the plurality of output signals using the plurality of antenna ports.

29. The apparatus of claim 28, further comprising:
means for transmitting, to the base station, a UE capability message that indicates coherence information associated with the plurality of groups of antenna ports, wherein the coherence information indicates that the antenna ports within the group of antenna ports are phase coherent with each other antenna port belonging to the group of antenna ports, and wherein the antenna ports within the group of antenna ports are phase incoherent with antenna ports belonging to the at least one other group of antenna ports.

30. The apparatus of claim 28, wherein the indication includes downlink control information (DCI) indicating at least one precoder to be applied in the closed-loop MIMO scheme.

\* \* \* \* \*